US012184847B2

(12) United States Patent
Yang et al.

(10) Patent No.: US 12,184,847 B2
(45) Date of Patent: Dec. 31, 2024

(54) INTRA SUB-PARTITIONS IN VIDEO CODING

(71) Applicant: VID SCALE, INC., Wilmington, DE (US)

(72) Inventors: Hua Yang, Plainsboro, NJ (US); Rahul Vanam, San Diego, CA (US); Yuwen He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 283 days.

(21) Appl. No.: 17/438,042

(22) PCT Filed: Mar. 11, 2020

(86) PCT No.: PCT/US2020/022121
§ 371 (c)(1),
(2) Date: Sep. 10, 2021

(87) PCT Pub. No.: WO2020/185910
PCT Pub. Date: Sep. 17, 2020

(65) Prior Publication Data
US 2022/0150486 A1     May 12, 2022

Related U.S. Application Data

(60) Provisional application No. 62/816,548, filed on Mar. 11, 2019, provisional application No. 62/860,122, filed on Jun. 11, 2019.

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/176* (2014.11); *H04N 19/593* (2014.11); *H04N 19/61* (2014.11)

(58) Field of Classification Search
CPC .. H04N 19/119; H04N 19/105; H04N 19/176; H04N 19/593; H04N 19/61
See application file for complete search history.

(56) References Cited

U.S. PATENT DOCUMENTS

| 7,929,931 B2 * | 4/2011 | Nakamura | H04H 60/64 |
| | | | 455/185.1 |
| 2008/0112484 A1 * | 5/2008 | Shih | H04N 19/50 |
| | | | 375/E7.243 |

(Continued)

FOREIGN PATENT DOCUMENTS

| WO | 2018/142903 A1 | 8/2018 |
| WO | 2019/154936 A1 | 8/2019 |

(Continued)

OTHER PUBLICATIONS

Ko, Geonjung Translation of WO 2020111843 Nov. 2019 (Year: 2019).*

(Continued)

*Primary Examiner* — Zaihan Jiang
(74) *Attorney, Agent, or Firm* — Condo Roccia Koptiw LLP

(57) ABSTRACT

Intra sub-partitions (ISP) may be enabled for a current block, for example, based on an ISP indication. The block may be partitioned into multiple sub-partitions, and a sub-partition may belong to a prediction unit (PU). A sub-partition width for the current block and a minimum prediction block width may be obtained. A PU corresponding to a current sub-partition may be determined based on the sub-partition width and the minimum prediction block width. For example, when the sub-partition width is less than the minimum prediction block width, the PU may include multiple sub-partitions. In examples, the minimum prediction block width may be four samples. Reference samples (Continued)

may be determined, and the PU may be predicted using the reference samples.

19 Claims, 30 Drawing Sheets

(51) Int. Cl.
    *H04N 19/176* (2014.01)
    *H04N 19/593* (2014.01)
    *H04N 19/61* (2014.01)

(56) References Cited

U.S. PATENT DOCUMENTS

| | | | |
|---|---|---|---|
| 2008/0232705 A1* | 9/2008 | Sohn | H04N 19/176 382/238 |
| 2015/0189272 A1* | 7/2015 | Peng | H04N 19/119 375/240.02 |
| 2015/0223705 A1* | 8/2015 | Sadhu | A61B 5/0006 600/595 |
| 2018/0020239 A1* | 1/2018 | Lee | H04N 19/60 |
| 2018/0332283 A1* | 11/2018 | Liu | H04N 19/11 |
| 2019/0037216 A1* | 1/2019 | Cho | H04N 19/159 |
| 2020/0252608 A1* | 8/2020 | Ramasubramonian | H04N 19/119 |
| 2021/0266586 A1* | 8/2021 | Leleannec | H04N 19/52 |

FOREIGN PATENT DOCUMENTS

| | | | | |
|---|---|---|---|---|
| WO | WO-2020111843 | * | 11/2019 | |
| WO | WO-2020061395 | * | 2/2020 | |
| WO | WO-2020163535 A1 | * | 8/2020 | H04N 19/105 |

OTHER PUBLICATIONS

"JEM-7.0 Reference Software", Available at <https://jvet.hhi.fraunhofer.de/svn/svn_HMJEMSoftware/tags/HM-16.6-JEM-7.0>, 1 page.
"VTM-1.0 Reference Software", Available at <https://jvet.hhi.fraunhofer.de/svn/svn_VVCSoftware_VTM/tags/VTM-1.0/>, 1 page.
Albrecht et al., "Description of SDR, HDR, and 360° Video Coding Technology Proposal by Fraunhofer HHI", JVET-J0014-V4, Fraunhofer HHI, Joint Video Experts Team (JVET) of ITU-T SG 16 WP 3 and ISO/IEC JTC 1/SC 29/WG 11, 10th Meeting: San Diego, US, Apr. 10-20, 2018, 122 pages.
Alshina et al., "Known Tools Performance Investigation for Next Generation Video Coding", VCEG-AZ05, Samsung Electronics, ITU—Telecommunications Standardization Sector, Study Group 16 Question 6, Video Coding Experts Group (VCEG), 52nd Meeting, Warsaw, Poland, Jun. 19-26, 2015, 5 pages.
Auwera et al., "Description of Core Experiment 3 (CE3): Intra Prediction and Mode Coding", JVET-M1023-v3, Joint Video Experts Team (JVET) of ITU-T SG 16 WP 3 and ISO/IEC JTC 1/SC 29/WG 11 13th Meeting: Marrakech, MA, Jan. 9-18, 2019, 25 pages.
Bossen, Frank, "VTM-4.0 Reference Software", Available at <https://vcgit.hhi.fraunhofer.de/jvet/VVCSoftware_VTM/tags/VTM-4.0>, pp. 1-2.
Bross et al., "High Efficiency Video Coding (HEVC) Text Specification Draft 10", JCTVC-L1003_v34, Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013, 310 pages.
Bross, Benjamin, "Versatile Video Coding (Draft 1)", JVET-J1001-V2, Editor, Joint Video Experts Team (JVET) of ITU-T SG 16 WP 3 and ISO/IEC JTC 1/SC 29/WG 11, 10th Meeting: San Diego, USA, Apr. 10-20, 2018, 40 pages.
Chen et al., "Algorithm Description for Versatile Video Coding and Test Model 4 (VTM 4)", JVET-M1002-V2, Editors, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-62.
Chen et al., "Coding Tools Investigation for Next Generation Video Coding", Qualcomm Incorporated, COM 16—C 806—E, International Telecommunication Union, Telecommunication Standardization Sector, Jan. 2015, pp. 1-7.
De Luxan Hernandez et al., "CE3: Line-Based Intra Coding Mode (Tests 2.1.1 and 2.1.2)", JVET-L0076-V2, Fraunhofer HHI, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-9.
De-Luxan-Hernandez et al., "CE3: Intra Sub-Partitions Coding Mode (Tests 1.1.1 and 1.1.2)", JVET-M0102-V5, Fraunhofer HHI, Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.
ITU-T, "Advanced Video Coding for Generic Audiovisual Services", ITU-T Recommendation H.264, Series H: Audiovisual and Multimedia Systems, Infrastructure of Audiovisual Services—Coding of Moving Video, Nov. 2007, 563 pages.
Karczewicz et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.
Lainema et al., "Intra Coding of the HEVC Standard", IEEE Transactions on Circuits and Systems for Video Technology, vol. 22, No. 12, Dec. 2012, pp. 1792-1801.
Li et al., "CE3-Related: Harmonization on MPM List", JVET-M0815-v2, Joint Video Experts Team (JVET) of ITU-T SG 16 WP 3 and ISO/IEC JTC 1/SC 29/WG 11 13th Meeting: Marrakech, MA, Jan. 9-18, 2019, 2 pages.
Ohm et al., "Report of AHG on Future Video Coding Standardization Challenges", AHG, ISO/IEC JTC1/SC29/WG11 MPEG2014/M36782, Warsaw, Poland, Jun. 2015, 4 pages.
Segall et al., "Joint Call for Proposals on Video Compression with Capability Beyond Hevc", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.
SMPTE, "VC-1 Compressed Video Bitstream Format and Decoding Process", SMPTE 421M, Apr. 2006, 493 pages.
Suhring et al., "H.264/14496-10 AVC Reference Software Manual (Revised for JM 19.0)", JVT-AE010, Apple Inc., Fraunhofer HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 98 pages.
Wang et al., "CE3-Related: Harmonization of MPM List Construction", JVET-M0295-r2, Joint Video Experts Team (JVET) of ITU-T SG 16 WP 3 and ISO/IEC JTC 1/SC 29/WG 11 13th Meeting: Marrakesh, Morocco, Jan. 9-18, 2019, 7 pages.
De-Luxan-Hernandez et al., "CE3: Intra Sub-Partitions Coding Mode (Tests 1.1.1 and 1.1.2)", JVET-M0102-v54, Fraunhofer HHI, Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.

* cited by examiner

INTRA SUB-PARTITIONS IN VIDEO CODING

CROSS-REFERENCE TO RELATED CASES

The present application is the National Stage Entry under 35 U.S.C. § 371 of Patent Cooperation Treaty Application No. PCT/US2020/022121, filed Mar. 11, 2020, which claims the benefit of U.S. Provisional Patent Application No. 62/816,548, filed Mar. 11, 2019, and U.S. Provisional Patent Application No. 62/860,122, filed Jun. 11, 2019, the contents of which are hereby incorporated by reference in their entireties.

BACKGROUND

Video coding systems may be used to compress digital video signals, e.g., to reduce the storage and/or transmission bandwidth needed for such signals. Video coding systems may include block-based, wavelet-based, and/or object-based systems. The systems may employ video coding techniques, for example, certain prediction techniques.

SUMMARY

Intra sub-partitions (ISP) may be an intra coding tool. Systems, methods, and instrumentalities may be provided, in which the sub-partition prediction may be partially or wholly independent of reconstruction of a previous neighboring sub-partition. A sub-partition may be predicted using prediction samples from a neighboring sub-partition. A sub-partition may be predicted using predicted samples and reconstructed samples from a previous neighboring sub-partition.

Multiple sub-partition based prediction may be used where intra-predictions of two and more sub-partitions may be conducted simultaneously from the related video block (e.g., a coding unit (CU) neighboring reference samples. A prediction unit (PU) including multiple sub-partitions may be predicted using reference samples neighboring the PU.

ISP may be enabled for a current block, for example, based on an ISP indication. A sub-partition width may be determined for the current block. The sub-partition width may be used for sub-partitioning the current block for intra prediction. A sub-partition may belong to a PU. A PU corresponding to the sub-partition may be determined based on the sub-partition width and a minimum prediction block width. In examples, the minimum prediction block width may be four samples. Prediction may be performed based on PUs. For example, reference samples may be determined, and a PU may be predicted using the reference samples. The reference samples may neighbor the PU.

A minimum prediction block width may be used in connection with the predictions of sub-partitions. One PU may comprise two or more sub-partitions that are vertically split or horizontally split. A prediction block width may be a sub-partition width or a multiple of a sub-partition width. The sub-partition width and a minimum prediction block width may be used to determine a prediction block. For example, a prediction block having multiple sub-partitions may be used for prediction when the sub-partition width is less than the minimum prediction block width. For example, when the minimum prediction block width is 4 samples, a prediction block having width of 4 samples may be used for prediction when the sub-partition width is less than 4 samples.

A PU may include multiple transform block sub-partitions. For example, for CUs having sizes of 4×8, 4×N (e.g., N>8), and 8×N, a PU in the respective CUs may include multiple transform block sub-partitions.

The PU of a CU may be predicted using CU neighboring samples and/or samples from reconstructed sub-partitions. For example, for CUs having sizes of 4×8 and 4×N, a video decoder or encoder may predict the PU using CU neighboring samples. For CUs having size of 8×N, the video decoder or encoder may predict the PU using CU neighboring samples and samples from reconstructed sub-partitions in the CU.

A method may include determining that ISP is enabled for a current block. The method may include determining a sub-partition width for the current block. The method may include determining a corresponding prediction block based on the sub-partition width and a minimum prediction block width for a sub-partition in the current block. The method may include determining reference samples. The method may include predicting the prediction block using the reference samples. The method herein may be performed by a decoder. In some examples, the method herein or a corresponding method may be performed by an encoder.

A computer-readable medium may include instructions for causing one or more processors to perform the method(s) described herein.

A computer program product including instructions which, when the program is executed by one or more processors, may cause the one or more processors to carry out the method(s) described herein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
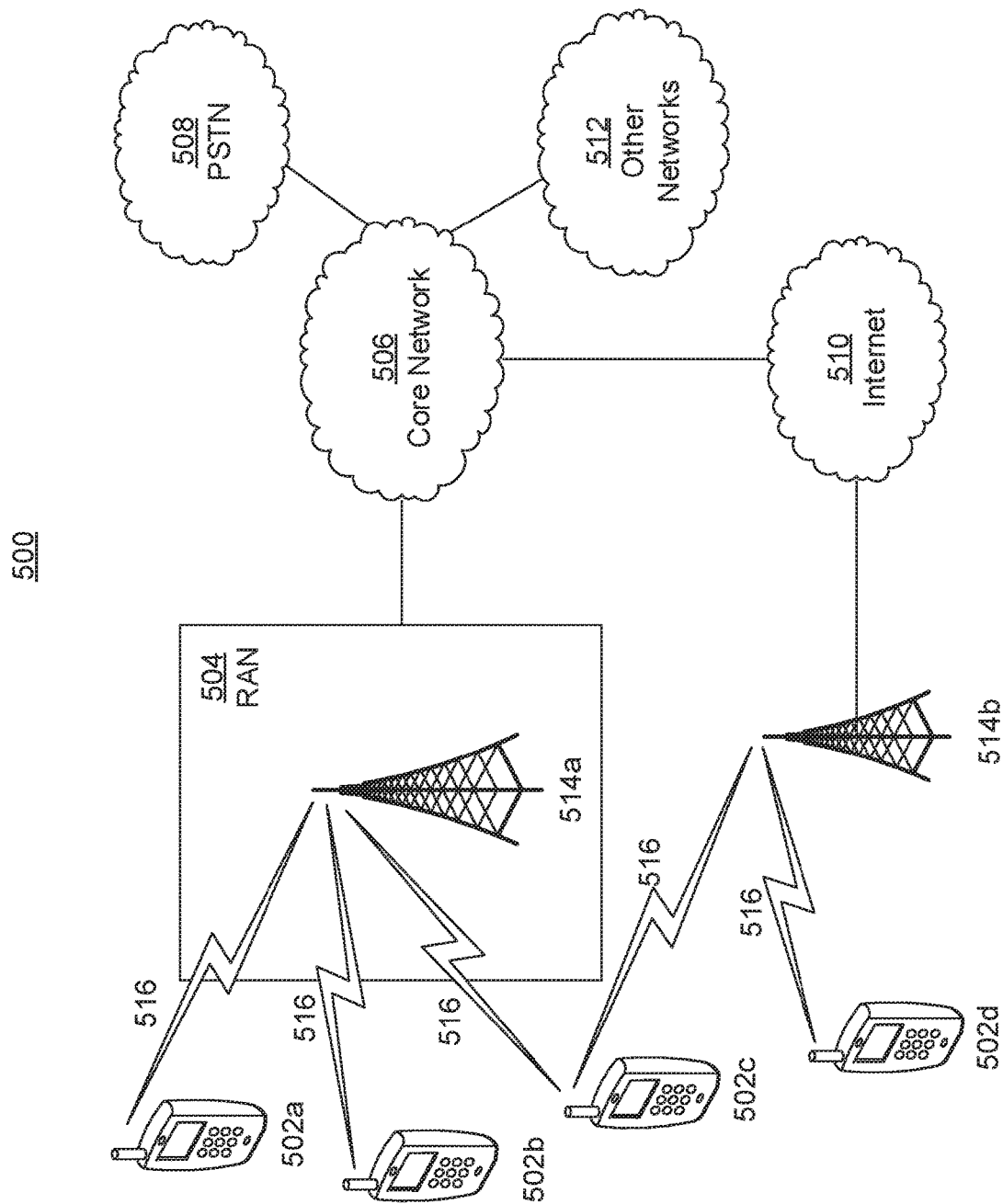
FIG. 1A is a system diagram illustrating an example communications system in which one or more disclosed embodiments may be implemented.

FIG. 1A is a diagram illustrating an example communications system 500 in which one or more disclosed embodiments may be implemented. The communications system 500 may be a multiple access system that provides content, such as voice, data, video, messaging, broadcast, etc., to multiple wireless users. The communications system 500 may enable multiple wireless users to access such content through the sharing of system resources, including wireless bandwidth. For example, the communications systems 500 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 500 may include wireless transmit/receive units (WTRUs) 502a, 502b, 502c, 502d, a RAN 504/513, a CN 506/515, a public switched telephone network (PSTN) 508, the Internet 510, and other networks 512, though it will be appreciated that the disclosed embodiments contemplate any number of WTRUs, base stations, networks, and/or network elements. Each of the WTRUs 502a, 502b, 502c, 502d may be any type of device configured to operate and/or communicate in a wireless environment By way of example, the WTRUs 502a, 502b, 502c, 502d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 502a, 502b, 502c and 502d may be interchangeably referred to as a UE.

The communications systems 500 may also include a base station 514a and/or a base station 514b. Each of the base stations 514a, 514b may be any type of device configured to wirelessly interface with at least one of the WTRUs 502a, 502b, 502c, 502d to facilitate access to one or more communication networks, such as the CN 506/515, the Internet 510, and/or the other networks 512. By way of example, the base stations 514a, 514b may be a base transceiver station (BTS), a Node-B, an eNode B, a Home Node B, a Home eNode B, a gNB, a NR NodeB, a site controller, an access point (AP), a wireless router, and the like. While the base stations 514a, 514b are each depicted as a single element, it will be appreciated that the base stations 514a, 514b may include any number of interconnected base stations and/or network elements.

The base station 514a may be part of the RAN 504/513, which may also include other base stations and/or network elements (not shown), such as a base station controller (BSC), a radio network controller (RNC), relay nodes, etc. The base station 514a and/or the base station 514b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 514a may be divided into three sectors. Thus, in one embodiment, the base station 514a may include three transceivers, i.e., one for each sector of the cell. In an embodiment, the base station 514a may employ multiple-input multiple output (MIMO) technology and may utilize multiple transceivers for each sector of the cell. For example, beamforming may be used to transmit and/or receive signals in desired spatial directions.

The base stations 514a, 514b may communicate with one or more of the WTRUs 502a, 502b, 502c, 502d over an air interface 516, which may be any suitable wireless communication link (e.g., radio frequency (RF), microwave, centimeter wave, micrometer wave, infrared (IR), ultraviolet (UV), visible light, etc.). The air interface 516 may be established using any suitable radio access technology (RAT).

More specifically, as noted above, the communications system 500 may be a multiple access system and may employ one or more channel access schemes, such as CDMA, TDMA, FDMA, OFDMA, SC-FDMA, and the like. For example, the base station 514a in the RAN 504/513 and the WTRUs 502a, 502b, 502c may implement a radio technology such as Universal Mobile Telecommunications System (UMTS) Terrestrial Radio Access (UTRA), which may establish the air interface 515/516/517 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 514a and the WTRUs 502a, 502b, 502c may implement a radio technology such as Evolved UMTS Terrestrial Radio Access (E-UTRA), which may establish the air interface 516 using Long Term Evolution (LTE) and/or LTE-Advanced (LTE-A) and/or LTE-Advanced Pro (LTE-A Pro).

In an embodiment, the base station 514a and the WTRUs 502a, 502b, 502c may implement a radio technology such as NR Radio Access, which may establish the air interface 516 using New Radio (NR).

In an embodiment, the base station 514a and the WTRUs 502a, 502b, 502c may implement multiple radio access technologies. For example, the base station 514a and the WTRUs 502a, 502b, 502c may implement LTE radio access and NR radio access together, for instance using dual connectivity (DC) principles. Thus, the air interface utilized by WTRUs 502a, 502b, 502c may be characterized by multiple types of radio access technologies and/or transmissions sent to/from multiple types of base stations (e.g., a eNB and a gNB).

In other embodiments, the base station 514a and the WTRUs 502a, 502b, 502c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 514b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 514b and the WTRUs 502c, 502d may implement a radio technology such as IEEE 802.11 to establish a wireless local area network (WLAN). In an embodiment, the base station 514b and the WTRUs 502c, 502d may implement a radio technology such as IEEE 802.15 to establish a wireless personal area network (WPAN). In yet another embodiment, the base station 514b and the WTRUs 502c, 502d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 514b may have a direct connection to the Internet 510. Thus, the base station 514b may not be required to access the Internet 510 via the CN 506/515.

The RAN 504/513 may be in communication with the CN 506/515, which may be any type of network configured to provide voice, data, applications, and/or voice over internet protocol (VoIP) services to one or more of the WTRUs 502a, 502b, 502c, 502d. The data may have varying quality of service (QoS) requirements, such as differing throughput requirements, latency requirements, error tolerance requirements, reliability requirements, data throughput requirements, mobility requirements, and the like. The CN 506/515 may provide call control, billing services, mobile location-based services, pre-paid calling, Internet connectivity, video distribution, etc., and/or perform high-level security functions, such as user authentication. Although not shown in FIG. 1A, it will be appreciated that the RAN 504/513 and/or the CN 506/515 may be in direct or indirect communication with other RANs that employ the same RAT as the RAN 504/513 or a different RAT. For example, in addition to being connected to the RAN 504/513, which may be utilizing a NR radio technology, the CN 506/515 may also be in communication with another RAN (not shown) employing a GSM, UMTS, CDMA 2000, WiMAX, E-UTRA, or WiFi radio technology.

The CN 506/515 may also serve as a gateway for the WTRUs 502a, 502b, 502c, 502d to access the PSTN 508, the Internet 510, and/or the other networks 512. The PSTN 508 may include circuit-switched telephone networks that provide plain old telephone service (POTS). The Internet 510 may include a global system of interconnected computer networks and devices that use common communication protocols, such as the transmission control protocol (TCP), user datagram protocol (UDP) and/or the internet protocol (IP) in the TCP/IP internet protocol suite. The networks 512 may include wired and/or wireless communications networks owned and/or operated by other service providers. For example, the networks 512 may include another CN connected to one or more RANs, which may employ the same RAT as the RAN 504/513 or a different RAT.

Some or all of the WTRUs 502a, 502b, 502c, 502d in the communications system 500 may include multi-mode capabilities (e.g., the WTRUs 502a, 502b, 502c, 502d may include multiple transceivers for communicating with different wireless networks over different wireless links). For example, the WTRU 502c shown in FIG. 1A may be configured to communicate with the base station 514a, which may employ a cellular-based radio technology, and with the base station 514b, which may employ an IEEE 802 radio technology.

Figure 1B:
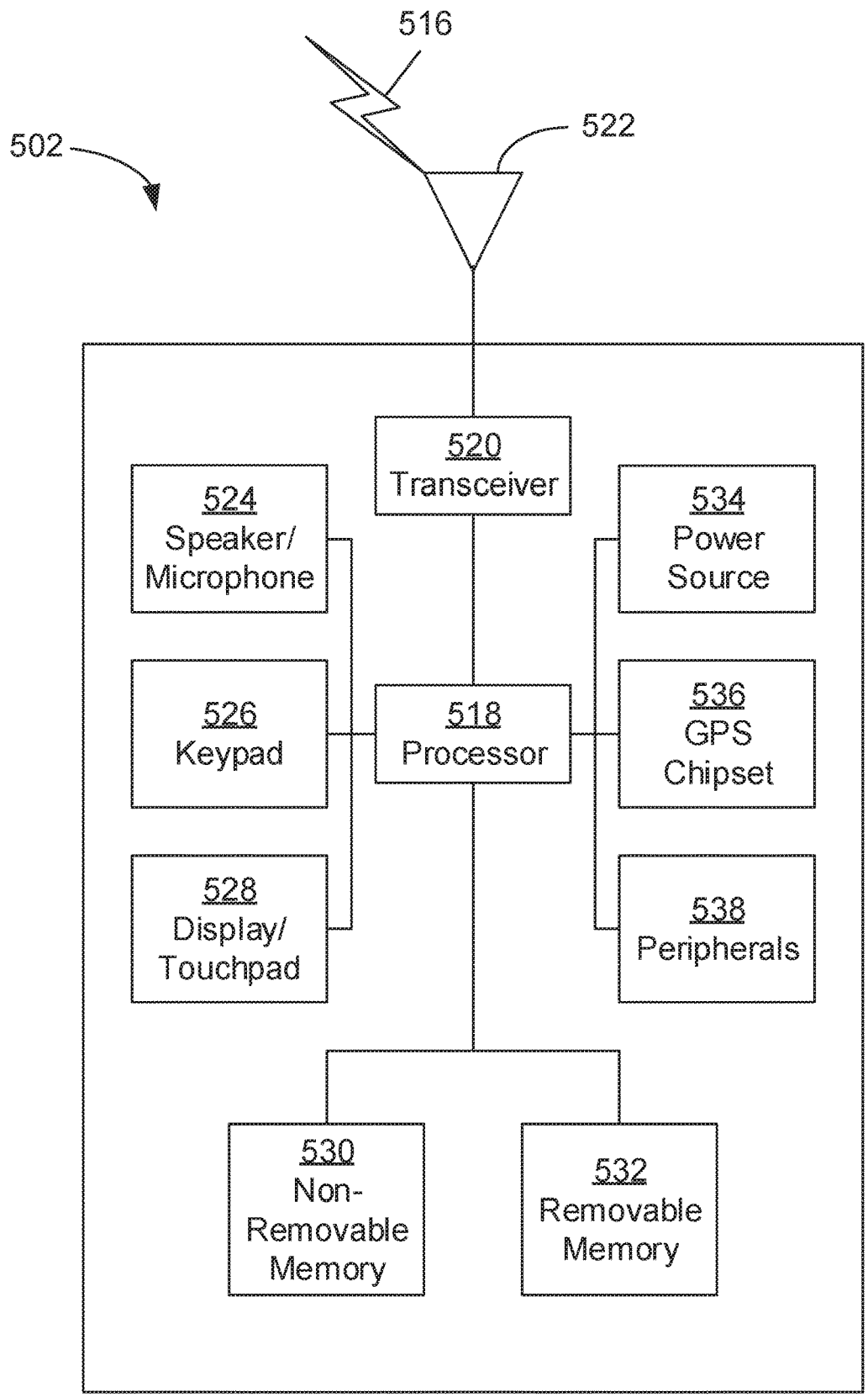
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 502. As shown in FIG. 1B, the WTRU 502 may include a processor 518, a transceiver 520, a transmit/receive element 522, a speaker/microphone 524, a keypad 526, a display/touchpad 528, non-removable memory 530, removable memory 532, a power source 534, a global positioning system (GPS) chipset 536, and/or other peripherals 538, among others. It will be appreciated that the WTRU 502 may include any sub-combination of the foregoing elements while remaining consistent with an embodiment.

The processor 518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 518 may perform signal coding, data processing, power control, input/output processing, and/or any other functionality that enables the WTRU 502 to operate in a wireless environment. The processor 518 may be coupled to the transceiver 520, which may be coupled to the transmit/receive element 522. While FIG. 1B depicts the processor 518 and the transceiver 520 as separate components, it will be appreciated that the processor 518 and the transceiver 520 may be integrated together in an electronic package or chip.

The transmit/receive element 522 may be configured to transmit signals to, or receive signals from, a base station (e.g., the base station 514a) over the air interface 516. For example, in one embodiment, the transmit/receive element 522 may be an antenna configured to transmit and/or receive RF signals. In an embodiment, the transmit/receive element 522 may be an emitter/detector configured to transmit and/or receive IR, UV, or visible light signals, for example. In yet another embodiment, the transmit/receive element 522 may be configured to transmit and/or receive both RF and light signals. It will be appreciated that the transmit/receive element 522 may be configured to transmit and/or receive any combination of wireless signals.

Although the transmit/receive element 522 is depicted in FIG. 1B as a single element, the WTRU 502 may include any number of transmit/receive elements 522. More specifically, the WTRU 502 may employ MIMO technology. Thus, in one embodiment, the WTRU 502 may include two or more transmit/receive elements 522 (e.g., multiple antennas) for transmitting and receiving wireless signals over the air interface 516.

The transceiver 520 may be configured to modulate the signals that are to be transmitted by the transmit/receive element 522 and to demodulate the signals that are received by the transmit/receive element 522. As noted above, the WTRU 502 may have multi-mode capabilities. Thus, the transceiver 520 may include multiple transceivers for enabling the WTRU 502 to communicate via multiple RATs, such as NR and IEEE 802.11, for example.

The processor 518 of the WTRU 502 may be coupled to, and may receive user input data from, the speaker/microphone 524, the keypad 526, and/or the display/touchpad 528 (e.g., a liquid crystal display (LCD) display unit or organic light-emitting diode (OLED) display unit). The processor 518 may also output user data to the speaker/microphone 524, the keypad 526, and/or the display/touchpad 528. In addition, the processor 518 may access information from, and store data in, any type of suitable memory, such as the non-removable memory 530 and/or the removable memory 532. The non-removable memory 530 may include random-access memory (RAM), read-only memory (ROM), a hard disk, or any other type of memory storage device. The removable memory 532 may include a subscriber identity module (SIM) card, a memory stick, a secure digital (SD) memory card, and the like. In other embodiments, the processor 518 may access information from, and store data in, memory that is not physically located on the WTRU 502, such as on a sewer or a home computer (not shown).

The processor 518 may receive power from the power source 534, and may be configured to distribute and/or control the power to the other components in the WTRU 502. The power source 534 may be any suitable device for powering the WTRU 502. For example, the power source 534 may include one or more dry cell batteries (e.g., nickel-cadmium (NiCd), nickel-zinc (NZn), nickel metal hydride (NiMH), lithium-ion (LI-ion), etc.), solar cells, fuel cells, and the like.

The processor 518 may also be coupled to the GPS chipset 536, which may be configured to provide location information (e.g., longitude and latitude) regarding the current location of the WTRU 502. In addition to, or in lieu of, the information from the GPS chipset 536, the WTRU 502 may receive location information over the air interface 516 from a base station (e.g., base stations 514a, 514b) and/or determine its location based on the timing of the signals being received from two or more nearby base stations. It will be appreciated that the WTRU 502 may acquire location information by way of any suitable location-determination method while remaining consistent with an embodiment.

The processor 518 may further be coupled to other peripherals 538, which may include one or more software and/or hardware modules that provide additional features, functionality and/or wired or wireless connectivity. For example, the peripherals 538 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 538 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 502 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 518). In an embodiment, the WRTU 502 may include a half-duplex radio for which transmission and reception of some or all of the signals (e.g., associated with particular subframes for either the UL (e.g., for transmission) or the downlink (e.g., for reception)).

Figure 1C:
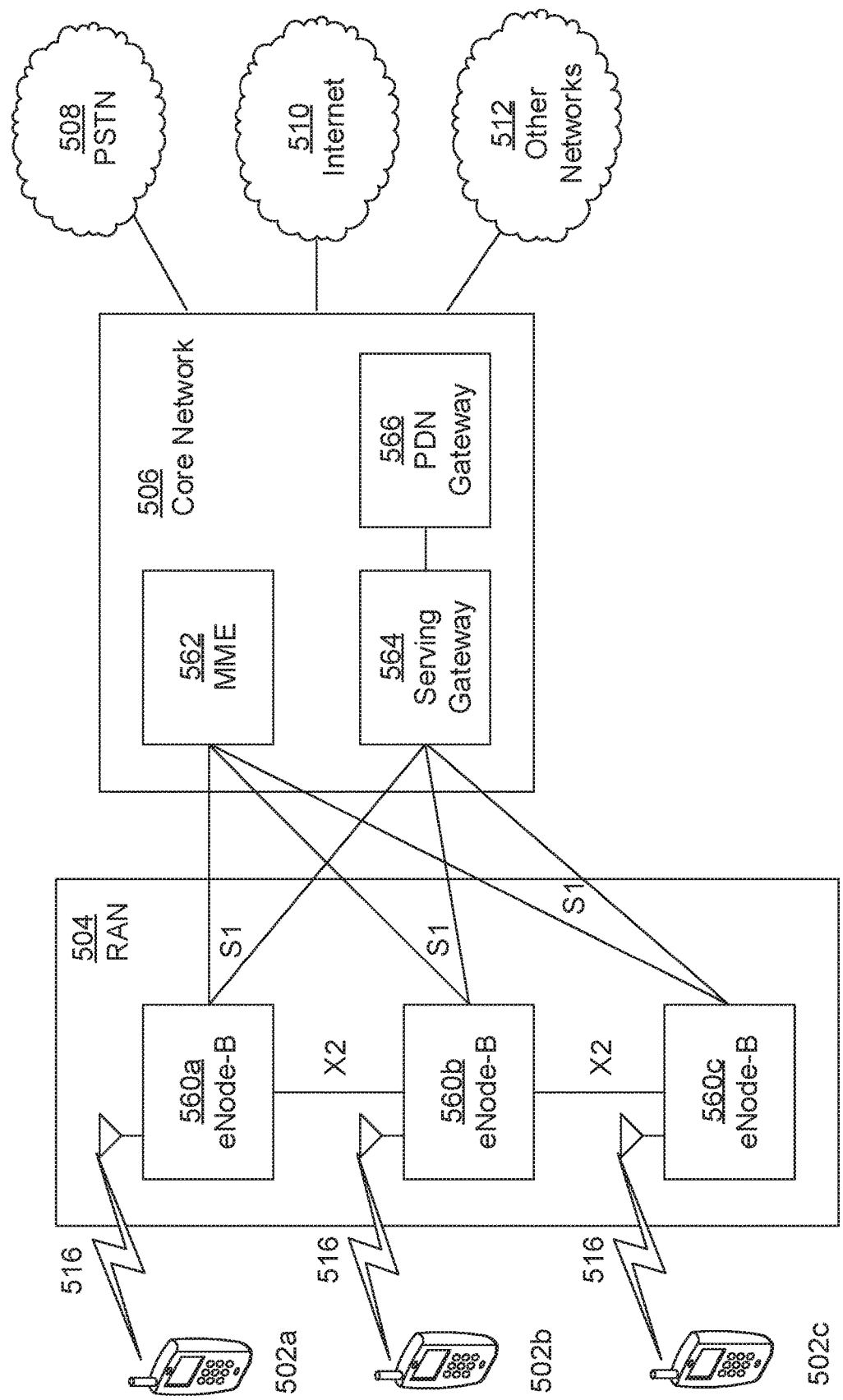
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 504 and the CN 506 according to an embodiment. As noted above, the RAN 504 may employ an E-UTRA radio technology to communicate with the WTRUs 502a, 502b, 502c over the air interface 516. The RAN 504 may also be in communication with the CN 506.

The RAN 504 may include eNode-Bs 560a, 560b, 560c, though it will be appreciated that the RAN 504 may include any number of eNode-Bs while remaining consistent with an embodiment. The eNode-Bs 560a, 560b, 560c may each include one or more transceivers for communicating with the WTRUs 502a, 502b, 502c over the air interface 516. In one embodiment, the eNode-Bs 560a, 560b, 560c may implement MIMO technology. Thus, the eNode-B 560a, for example, may use multiple antennas to transmit wireless signals to, and/or receive wireless signals from, the WTRU 502a.

Each of the eNode-Bs 560a, 560b, 560c may be associated with a particular cell (not shown) and may be configured to handle radio resource management decisions, handover decisions, scheduling of users in the UL and/or DL, and the like. As shown in FIG. 1C, the eNode-Bs 560a, 560b, 560c may communicate with one another over an X2 interface.

The CN 506 shown in FIG. 1C may include a mobility management entity (MME) 562, a serving gateway (SGW) 564, and a packet data network (PDN) gateway (or PGW) 566. While each of the foregoing elements are depicted as part of the CN 506, it will be appreciated that any of these elements may be owned and/or operated by an entity other than the CN operator.

The MME 562 may be connected to each of the eNode-Bs 562a, 562b, 562c in the RAN 504 via an S1 interface and may serve as a control node. For example, the MME 562 may be responsible for authenticating users of the WTRUs 502a, 502b, 502c, bearer activation/deactivation, selecting a particular serving gateway during an initial attach of the WTRUs 502a, 502b, 502c, and the like. The MME 562 may provide a control plane function for switching between the RAN 504 and other RANs (not shown) that employ other radio technologies, such as GSM and/or WCDMA.

The SGW 564 may be connected to each of the eNode Bs 560a, 560b, 560c in the RAN 504 via the S1 interface. The SGW 564 may generally route and forward user data packets to/from the WTRUs 502a, 502b, 502c. The SGW 564 may perform other functions, such as anchoring user planes during inter-eNode B handovers, triggering paging when DL data is available for the WTRUs 502a, 502b, 502c, managing and storing contexts of the WTRUs 502a, 502b, 502c, and the like.

The SGW 564 may be connected to the PGW 566, which may provide the WTRUs 502a, 502b, 502c with access to packet-switched networks, such as the Internet 510, to facilitate communications between the WTRUs 502a, 502b, 502c and IP-enabled devices.

The CN 506 may facilitate communications with other networks. For example, the CN 506 may provide the WTRUs 502a, 502b, 502c with access to circuit-switched networks, such as the PSTN 508, to facilitate communications between the WTRUs 502a, 502b, 502c and traditional land-line communications devices. For example, the CN 506 may include, or may communicate with, an IP gateway (e.g., an IP multimedia subsystem (IMS) server) that serves as an interface between the CN 506 and the PSTN 508. In addition, the CN 506 may provide the WTRUs 502a, 502b, 502c with access to the other networks 512, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 512 may be a WLAN.

A WLAN in Infrastructure Basic Service Set (BSS) mode may have an Access Point (AP) for the BSS and one or more stations (STAs) associated with the AR The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
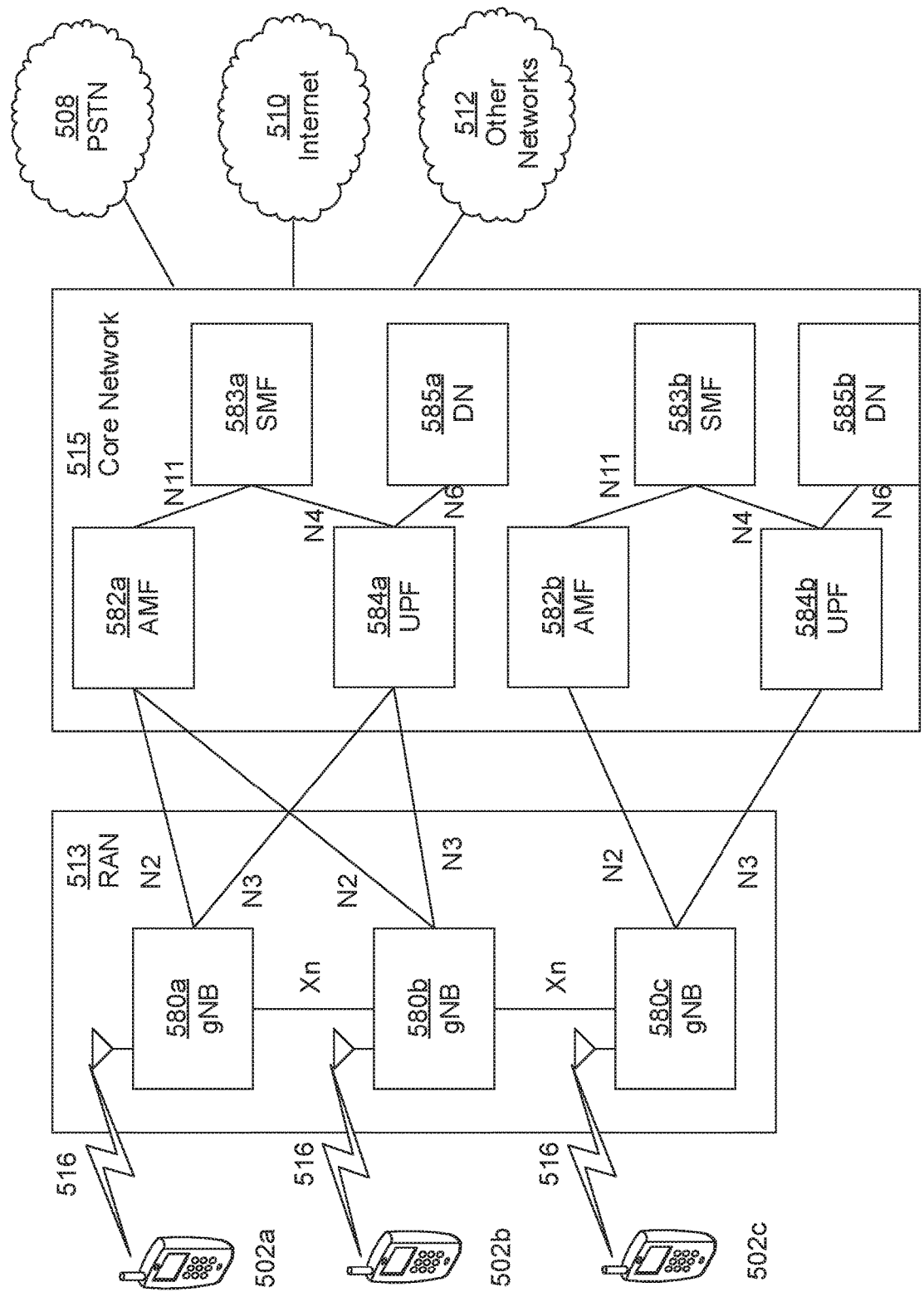
FIG. 1D is a system diagram illustrating a further example RAN and a further example CN that may be used within the communications system illustrated in FIG. 1A according to an embodiment.

FIG. 1D is a system diagram illustrating the RAN 513 and the CN 515 according to an embodiment. As noted above, the RAN 513 may employ an NR radio technology to communicate with the WTRUs 502a, 502b, 502c over the air interface 516. The RAN 513 may also be in communication with the CN 515.

The RAN 513 may include gNBs 580a, 580b, 580c, though it will be appreciated that the RAN 513 may include any number of gNBs while remaining consistent with an embodiment. The gNBs 580a, 580b, 580c may each include one or more transceivers for communicating with the WTRUs 502a, 502b, 502c over the air interface 516. In one embodiment, the gNBs 580a, 580b, 580c may implement MIMO technology. For example, gNBs 580a, 508b may utilize beamforming to transmit signals to and/or receive signals from the gNBs 580a, 580b, 580c. Thus, the gNB 580a, for example, may use multiple antennas to transmit wireless signals to, and/or receive wireless signals from, the WTRU 502a. In an embodiment, the gNBs 580a, 580b, 580c may implement carrier aggregation technology. For example, the gNB 580a may transmit multiple component carriers to the WTRU 502a (not shown). A subset of these component carriers may be on unlicensed spectrum while the remaining component carriers may be on licensed spectrum. In an embodiment, the gNBs 580a, 580b, 580c may implement Coordinated Multi-Point (CoMP) technology. For example, WTRU 502a may receive coordinated transmissions from gNB 580a and gNB 580b (and/or gNB 580c).

The WTRUs 502a, 502b, 502c may communicate with gNBs 580a, 580b, 580c using transmissions associated with a scalable numerology. For example, the OFDM symbol spacing and/or OFDM subcarrier spacing may vary for different transmissions, different cells, and/or different portions of the wireless transmission spectrum. The WTRUs 502a, 502b, 502c may communicate with gNBs 580a, 580b, 580c using subframe or transmission time intervals (TTIs) of various or scalable lengths (e.g., containing varying number of OFDM symbols and/or lasting varying lengths of absolute time).

The gNBs 580a, 580b, 580c may be configured to communicate with the WTRUs 502a, 502b, 502c in a standalone configuration and/or a non-standalone configuration. In the standalone configuration, WTRUs 502a, 502b, 502c may communicate with gNBs 580a, 580b, 580c without also accessing other RANs (e.g., such as eNode-Bs 560a, 560b, 560c). In the standalone configuration, WTRUs 502a, 502b, 502c may utilize one or more of gNBs 580a, 580b, 580c as a mobility anchor point. In the standalone configuration, WTRUs 502a, 502b, 502c may communicate with gNBs 580a, 580b, 580c using signals in an unlicensed band. In a non-standalone configuration WTRUs 502a, 502b, 502c may communicate with/connect to gNBs 580a, 580b, 580c while also communicating with/connecting to another RAN such as eNode-Bs 560a, 560b, 560c. For example, WTRUs 502a, 502b, 502c may implement DC principles to communicate with one or more gNBs 580a, 580b, 580c and one or more eNode-Bs 560a, 560b, 560c substantially simultaneously. In the non-standalone configuration, eNode-Bs 560a, 560b, 560c may serve as a mobility anchor for WTRUs 502a, 502b, 502c and gNBs 580a, 580b, 580c may provide additional coverage and/or throughput for servicing WTRUs 502a, 502b, 502c.

Each of the gNBs 580a, 580b, 580c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 584a, 584b, routing of control plane information towards Access and Mobility Management Function (AMF) 582a, 582b and the like. As shown in FIG. 1D, the gNBs 580a, 580b, 580c may communicate with one another over an Xn interface.

The CN 515 shown in FIG. 1D may include at least one AMF 582a, 582b, at least one UPF 584a,584b, at least one Session Management Function (SMF) 583a, 583b, and possibly a Data Network (DN) 585a, 585b. While each of the foregoing elements are depicted as part of the CN 515, it will be appreciated that any of these elements may be owned and/or operated by an entity other than the CN operator.

The AMF 582a, 582b may be connected to one or more of the gNBs 580a, 580b, 580c in the RAN 513 via an N2 interface and may serve as a control node. For example, the AMF 582a, 582b may be responsible for authenticating users of the WTRUs 502a, 502b, 502c, support for network slicing (e.g., handling of different PDU sessions with different requirements), selecting a particular SMF 583a, 583b, management of the registration area, termination of NAS signaling, mobility management, and the like. Network slicing may be used by the AMF 582a, 582b in order to customize CN support for WTRUs 502a, 502b, 502c based on the types of services being utilized WTRUs 502a, 502b, 502c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 562 may provide a control plane function for switching between the RAN 513 and other RANs (not shown) that employ other radio technologies, such as LTE, LTE-A, LTE-A Pro, and/or non-3GPP access technologies such as WiFi.

The SMF 583a, 583b may be connected to an AMF 582a, 582b in the CN 515 via an N11 interface. The SMF 583a, 583b may also be connected to a UPF 584a, 584b in the CN 515 via an N4 interface. The SMF 583a, 583b may select and control the UPF 584a, 584b and configure the routing of traffic through the UPF 584a, 584b. The SMF 583a, 583b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 584a, 584b may be connected to one or more of the gNBs 580a, 580b, 580c in the RAN 513 via an N3 interface, which may provide the WTRUs 502a, 502b, 502c with access to packet-switched networks, such as the Internet 510, to facilitate communications between the WTRUs 502a, 502b, 502c and IP-enabled devices. The UPF 584, 584b may perform other functions, such as routing and forwarding packets, enforcing user plane policies, supporting multi-homed PDU sessions, handling user plane QoS, buffering downlink packets, providing mobility anchoring, and the like.

The CN 515 may facilitate communications with other networks. For example, the CN 515 may include, or may communicate with, an IP gateway (e.g., an IP multimedia subsystem (IMS) server) that serves as an interface between the CN 515 and the PSTN 508. In addition, the CN 515 may provide the WTRUs 502a, 502b, 502c with access to the other networks 512, which may include other wired and/or wireless networks that are owned and/or operated by other service providers. In one embodiment, the WTRUs 502a, 502b, 502c may be connected to a local Data Network (DN) 585a, 585b through the UPF 584a, 584b via the N3 interface to the UPF 584a, 584b and an N6 interface between the UPF 584a, 584b and the DN 585a, 585b.

In view of FIGS. 1A-1D, and the corresponding description of FIGS. 1A-1D, one or more, or all, of the functions described herein with regard to one or more of: WTRU 502a-d, Base Station 514a-b, eNode-B 560a-c, MME 562, SGW 564, PGW 566, gNB 580a-c, AMF 582a-b, UPF 584a-b, SMF 583a-b, DN 585a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 1-20 described herein may provide some examples, but other examples are contemplated and the discussion of FIGS. 1-20 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, "decoded" is used at the decoder side. The term "reconstructed" is used at the encoder side and/or at the decoder side.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
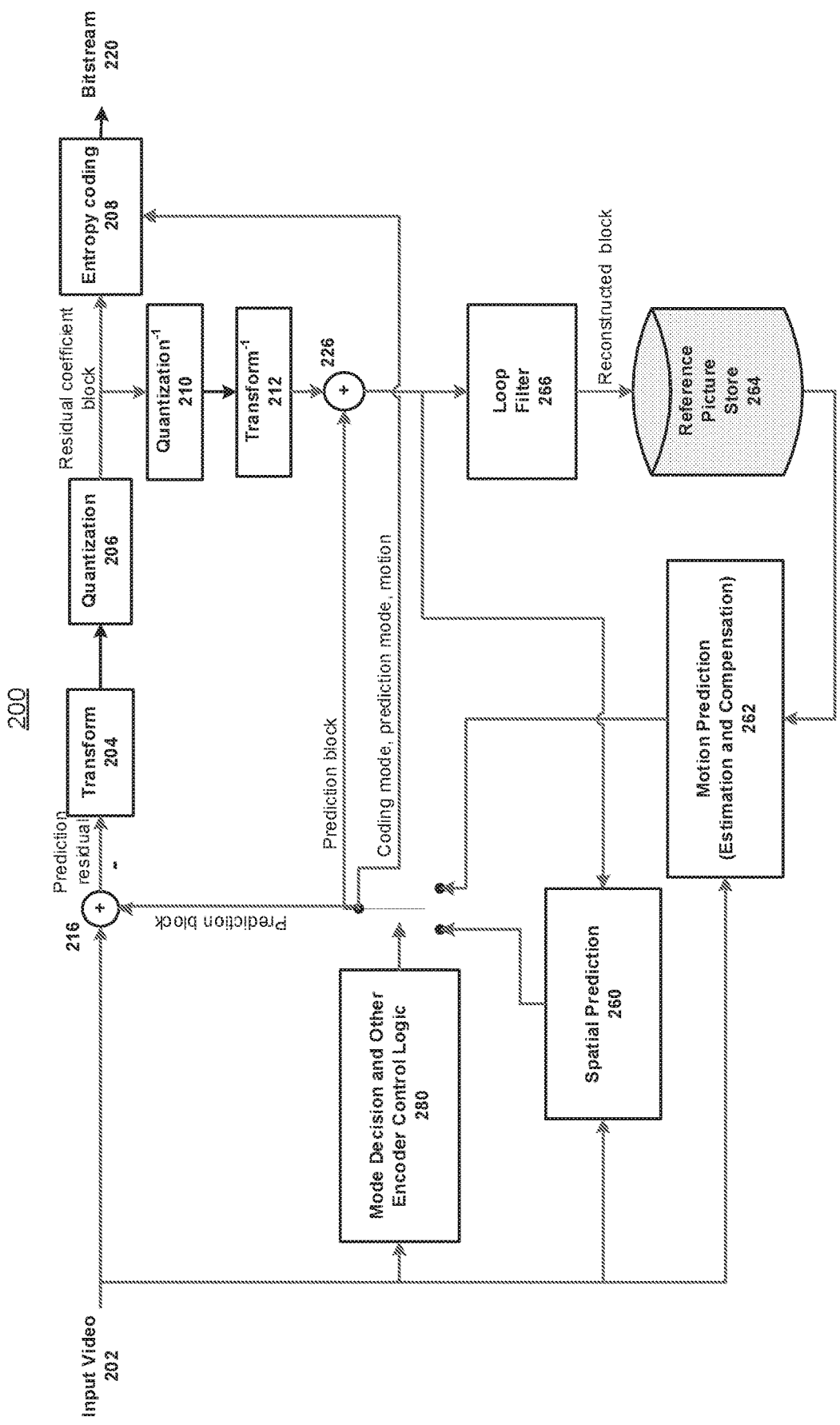
FIG. 2 is a diagram of an example block-based video encoder.
Figure 3:
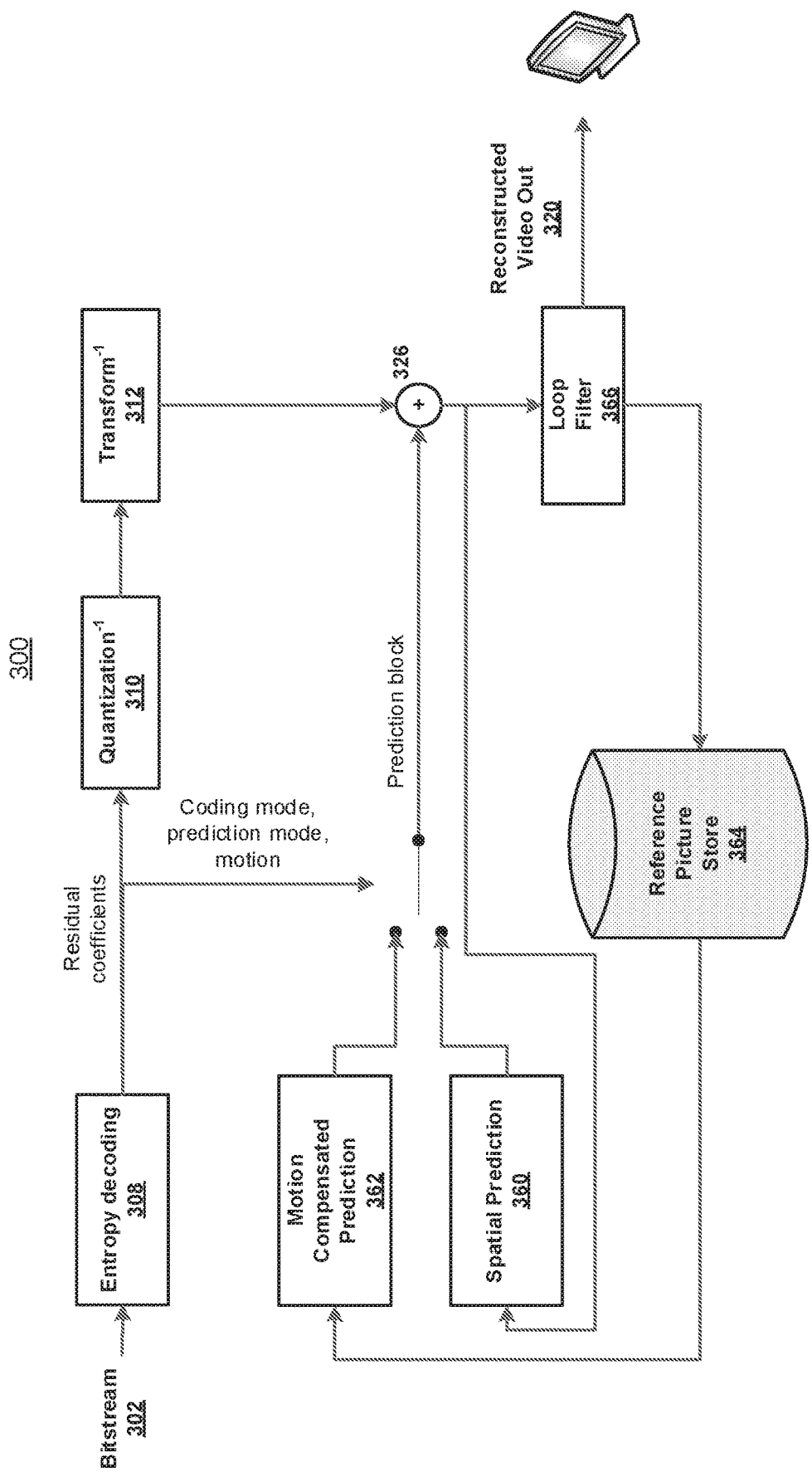
FIG. 3 is a diagram of an example video decoder.

Various methods and other aspects described in this application can be used to modify modules, for example, decoding modules, of a video encoder 100 and decoder 200 as shown in FIG. 2 and FIG. 3. Moreover, the present aspects are not limited to WC or HEVC, and can be applied, for example, to other standards and recommendations, whether pre-existing or future-developed, and extensions of any such standards and recommendations (including WC and HEVC). Unless indicated otherwise, or technically precluded, the aspects described in this application can be used individually or in combination.

Various numeric values are used in the present application, for example, CU sizes of 4×8, 4×N, 8×4 and 8×N, the minimum prediction block width being four samples, a PU including 32 or more samples, etc. The specific values are for example purposes and the aspects described are not limited to these specific values.

Block-based video coding systems, such as WC, may include a block-based hybrid video coding framework. FIG. 2 illustrates a block diagram of an example block-based hybrid video encoding system 200. Variations of this encoder 200 are contemplated, but the encoder 200 is described below for purposes of clarity without describing all expected variations. The input video signal 202 may be processed block by block (e.g., coding unit (CU))). A CU may include CU sizes of up to 128×128 pixels. A coding tree unit (CTU) may be split into CUs to adapt to varying local characteristics based on quad/binary/ternary-tree. A CU may be used as the basic unit for prediction and transform without further partitions. In a multi-type tree structure, a CTU may be partitioned by a quad-tree structure. A quad-tree leaf node (e.g., each quad tree lead node) may be further partitioned by a binary and ternary tree structure.

Referring to FIG. 2, for an input video block (e.g., a macroblock (MB) or CU), spatial prediction 260 or motion prediction 262 may be performed. Spatial prediction (e.g., or intra prediction) may use pixels from already coded neighboring blocks in the same video picture and/or slice to predict a current video block. Spatial prediction may reduce spatial redundancy inherent in the video signal. Temporal prediction (e.g., referred to as inter prediction or motion compensated prediction) may use pixels from already coded video pictures to predict a current video block. Temporal prediction may reduce temporal redundancy inherent in the video signal. Temporal prediction signal for a CU may be signaled by one or more motion vectors (MVs) that may indicate the amount and the direction of motion between the current CU and its temporal reference. If multiple reference pictures are supported, a reference picture index may be signaled to a decoder. The reference index may be used to identify from which reference picture in a reference picture store 264 the temporal prediction signal may come.

After spatial and/or temporal prediction, a mode decision 280 in the encoder may select a prediction mode, for example based on a rate-distortion optimization mechanism. The prediction block may be subtracted from the current video block at 216. Prediction residuals may be de-correlated using a transform module 204 and a quantization module 206 to achieve a target bit-rate. The quantized residual coefficients may be inverse quantized at 210 and inverse transformed at 212 to form reconstructed residuals. The reconstructed residuals may be added back to the prediction block at 226 to form a reconstructed video block. An in-loop filter such as a de-blocking filter and/or an adaptive loop filter may be applied to the reconstructed video block at 266 before it is put in the reference picture store 264. Reference pictures in the reference picture store 264 may be used to code future video blocks. An output video bit-stream 220 may be formed. Coding mode (e.g., inter or intra), prediction mode information, motion information, and/or quantized residual coefficients may be sent to an entropy coding unit 208 to be compressed and packed to form the bit-stream 220.

FIG. 3 illustrates a general block diagram of an example block-based video decoder 300. A video bit-stream 302 may be received, unpacked, and/or entropy decoded at an entropy decoding unit 308. Coding mode and/or prediction information may be sent to a spatial prediction unit 360 (e.g., if intra coded) and/or to a temporal prediction unit 362 (e.g., if inter coded) to form a prediction block. Residual transform coefficients may be sent to an inverse quantization unit 310 and an inverse transform unit 312 to reconstruct a residual block. The prediction block and residual block may be added at 326. The reconstructed block may go through in-loop filtering 366 and may be stored in a reference picture store 364. Reconstructed videos in the reference picture store 364 may be used to drive a display device and/or to predict future video blocks. In an example, a decoder 300 may determine that ISP is enabled for a current block after receiving, unpacking and/or entropy decoding the video bit-stream 302. The coding mode information (e.g., intra coding mode) may be sent to a spatial prediction unit 360 to form a prediction block. The decoder 300 may determine s sub-partition width for the current block based on the unpacked and/or entropy decoded video bit-stream 302. For a sub-partition in the current block, the decoder may determine a corresponding prediction block based on the sub-partition width and a minimum prediction block width. The minimum prediction block width may be a predetermined value of a prediction block width. The decoder 300 may determine reference samples at the spatial prediction unit 360. The decoder 300 may predict the prediction block using the reference samples.

Figure 4:
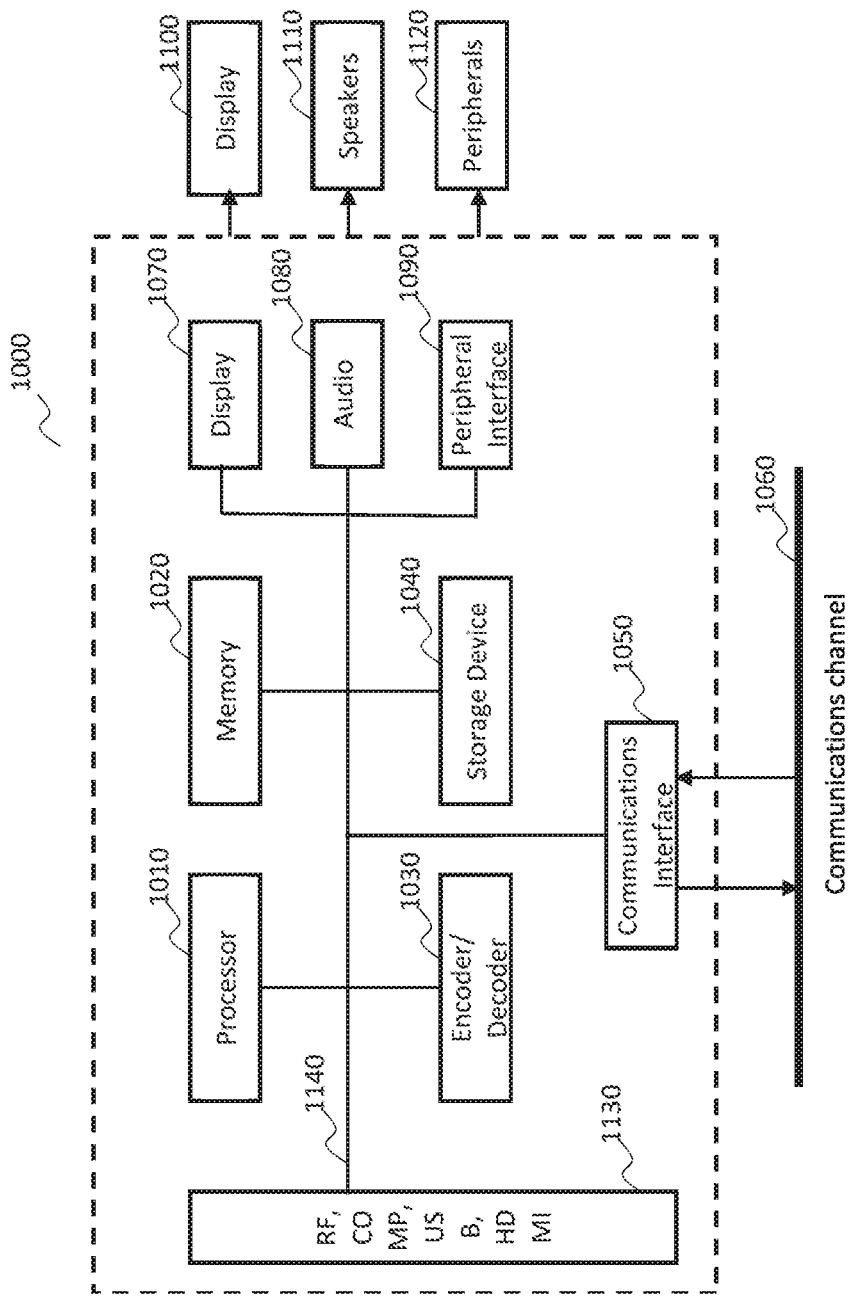
FIG. 4 illustrates a block diagram of an example of a system in which various aspects and examples are implemented.

FIG. 4 illustrates a block diagram of an example of a system in which various aspects and examples are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one example, the processing and encoder/decoder elements of system 1000 are distributed across multiple ICs and/or discrete components. In various examples, the system 1000 is communicatively coupled to one or more other systems, or other electronic devices, via, for example, a communications bus or through dedicated input and/or output ports. In various examples, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples. In an example, an apparatus comprising one or more processors may be configured to perform determining that ISP is enabled for a current block. The one or more processors may be configured to perform determining a sub-partition width for the current block. The one or more processors may be configured to perform determining a corresponding prediction block based on the sub-partition width and a minimum prediction block width for a sub-partition in the current block. The one or more processors may be configured to perform determining reference samples. The one or more processors may be configured to perform predicting the prediction block using the reference samples. The apparatus comprising the one or more processors may be a decoder or an encoder.

A signal may be sent to enable the apparatus to perform one or more steps herein. For example, an apparatus may include an access unit configured to access data that enables the apparatus to perform one or more steps herein and a transmitter configured to transmit the data. A method may include accessing data that enables an apparatus to perform one or more steps herein and transmitting the data. A computer-readable medium may include data that enables an apparatus to perform one or more steps herein.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various examples, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 1010 and/or the encoder/decoder module 1030 is used to store instructions and to provide working memory for processing that is needed during encoding or decoding. In other examples, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain examples, (v) demodulating the downconverted and band-limited signal, (v) performing error correction, and (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna. In an example, a device may comprise an apparatus herein and at least one of (i) an antenna configured to receive a signal including data representative of an image, (ii) a band limiter configured to limit the received signal to a band of frequencies that includes the data representative of the image, or (iii) a display configured to display the image. A device configured to perform as the apparatus herein may include a TV, a cell phone, a tablet, or a set-top box (STB).

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various examples, using a wireless network such as a Wi-Fi network, for example IEEE 802.11 (IEEE refers to the Institute of Electrical and Electronics Engineers). The Wi-Fi signal of these examples is received over the communications channel 1060 and the communications interface 1050 which are adapted for Wi-Fi communications. The communications channel 1060 of these examples is typically connected to an access point or router that provides access to external networks including the Internet for allowing streaming applications and other over-the-top communications. Other examples provide streamed data to the system 1000 using a set-top box that delivers the data over the HDMI connection of the input block 1130. Still other examples provide streamed data to the system 1000 using the RF connection of the input block 1130. As indicated above, various examples provide data in a non-streaming manner. Additionally, various examples use wireless networks other than Wi-Fi, for example a cellular network or a Bluetooth network.

The system 1000 can provide an output signal to various output devices, including a display 1100, speakers 1110, and other peripheral devices 1120. The display 1100 of various examples includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of examples, one or more of a standalone digital video disc (or digital versatile disc) (DVR, for both terms), a disk player, a stereo system, and/or a lighting system. Various examples use one or more peripheral devices 1120 that provide a function based on the output of the system 1000. For example, a disk player performs the function of playing the output of the system 1000.

In various examples, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various examples, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various examples in which the display 1100 and speakers 1110 are external components, the output signal can be provided via dedicated output connections, including, for example, HDMI ports, USB ports, or COMP outputs.

The examples can be carried out by computer software implemented by the processor 1010 or by hardware, or by a combination of hardware and software. As a non-limiting example, the examples can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, determining a corresponding prediction block based on a sub-partition width and a minimum prediction block width for a sub-partition in the current block.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, determining a corresponding prediction block based on a sub-partition width and a minimum prediction block width for a sub-partition in the current block.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various examples refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, determining, identifying and/or retrieving.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain examples the encoder signals a particular index indicating the choice of samples to be used for predicting a sub-partition. In this way, in an example the same parameter is used at both the encoder side and the decoder side, Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various examples. It is to be appreciated that signaling can be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described example. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of examples. Features of these examples can be provided alone or in any combination, across various claim categories and types. Further, examples can include one or more of the following features, devices, or aspects, alone or in any combination, across various claim categories and types.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Figure 5:
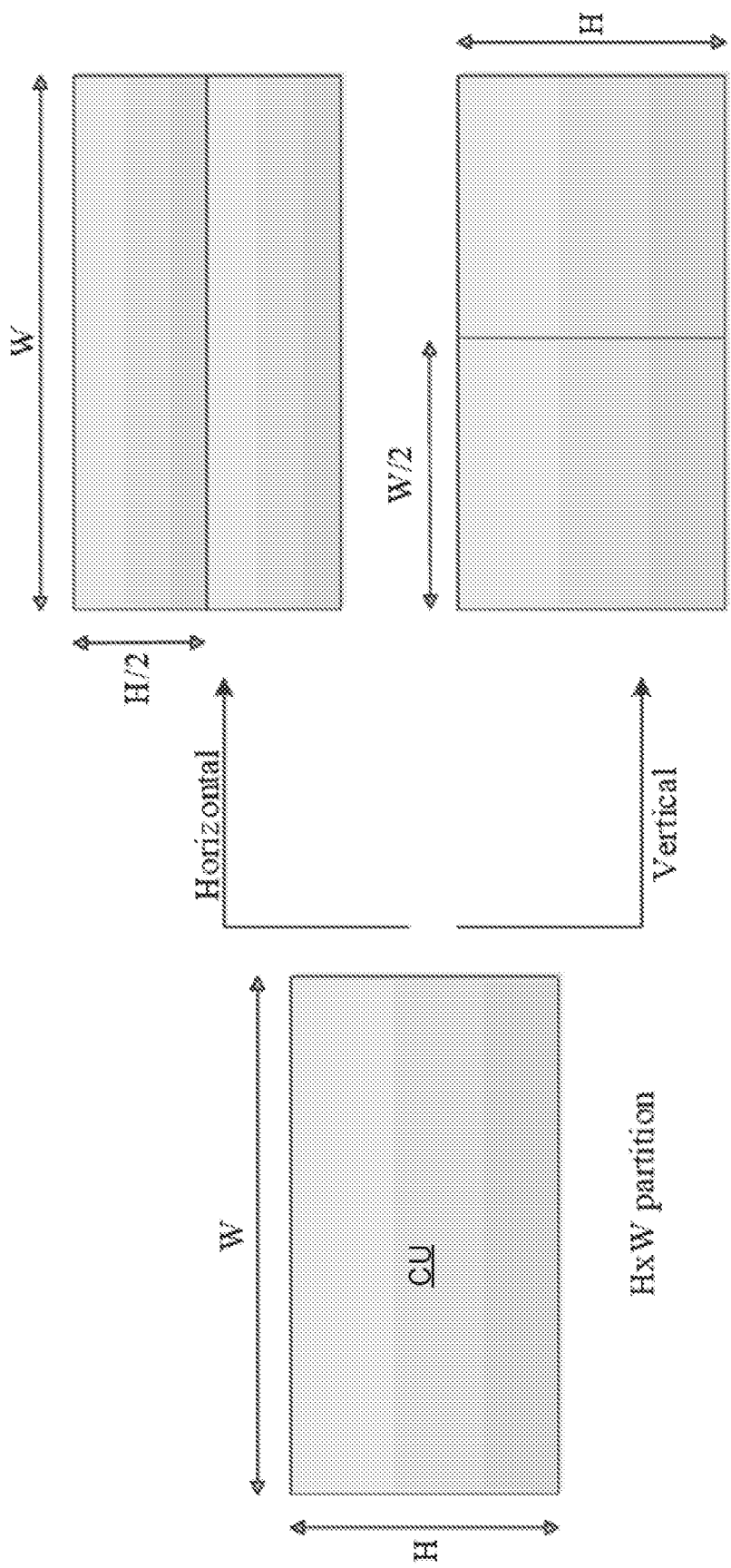
FIG. 5 illustrates an example of partitioning or CU-split that may be allowed for CUs (e.g., a 4×8 pixels CU or an 8×4 pixels CU).
Figure 6:
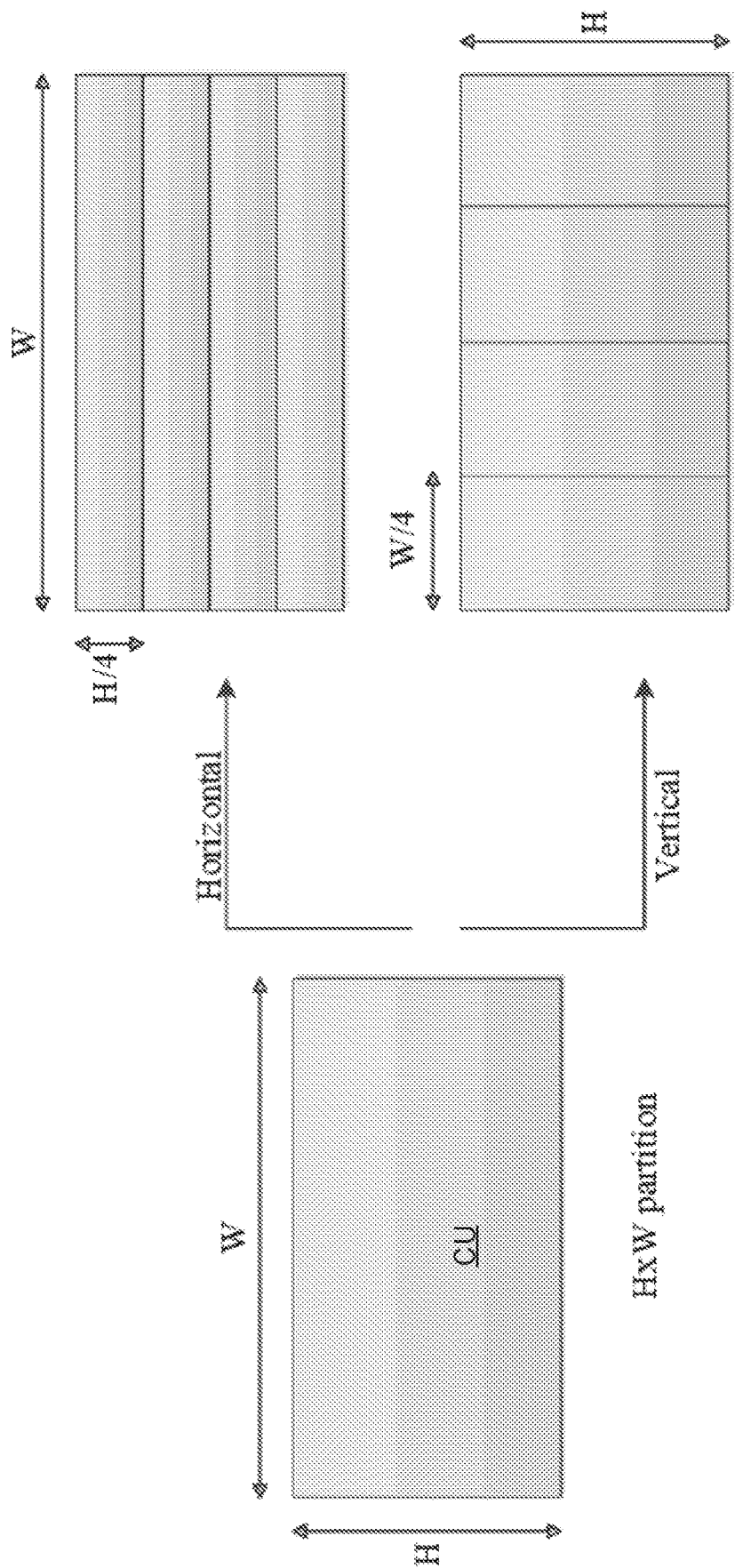
FIG. 6 illustrates an example of partitioning that may be allowed for CUs (e.g., CUs greater than 4×8 pixels or 8×4 pixels).

An intra coding tool, for example, an intra sub-partitions (ISP) tool may be used. The ISP tool may applicable to a luma channel. The ISP tool may partition a CU into multiple sub-partitions (e.g., two or four sub-partitions). A sub-partition may comprise multiple (e.g., at least 16) samples. Partitioning may be performed in a horizontal direction and/or a vertical direction. CU-split may be performed in a horizontal direction and/or a vertical direction. FIG. 5 illustrates an example of partitioning or CU-split that may be allowed for CUs (e.g., a 4×8 pixels CU or an 8×4 pixels CU). As illustrated in FIG. 5 ISP tool may split a CU into two sub-partitions. The ISP split type may be vertical or horizontal. FIG. 6 illustrates an example of partitioning that may be allowed for CUs (e.g., CUs greater than 4×8 pixels or 8×4 pixels). As illustrated in FIG. 6, for relatively larger CUs (e.g., CUs greater than 4×8 pixels or 8×4 pixels), the ISP tool may split a CU into four sub-partitions. An intra prediction mode may be used for the sub-partitions. For example, a same intra prediction mode may be used for the sub-partitions in a CU.

An MPM flag may be set (e.g., set to one), for example, when the intra mode used for ISP is a member of a most probable mode (MPM) list. Intra reference sample smoothing filter and/or position dependent intra prediction combination (PDPC) may be disabled for ISP. Reference line zero may be used for ISP. Multiple reference line intra prediction may be disabled.

Figure 7:
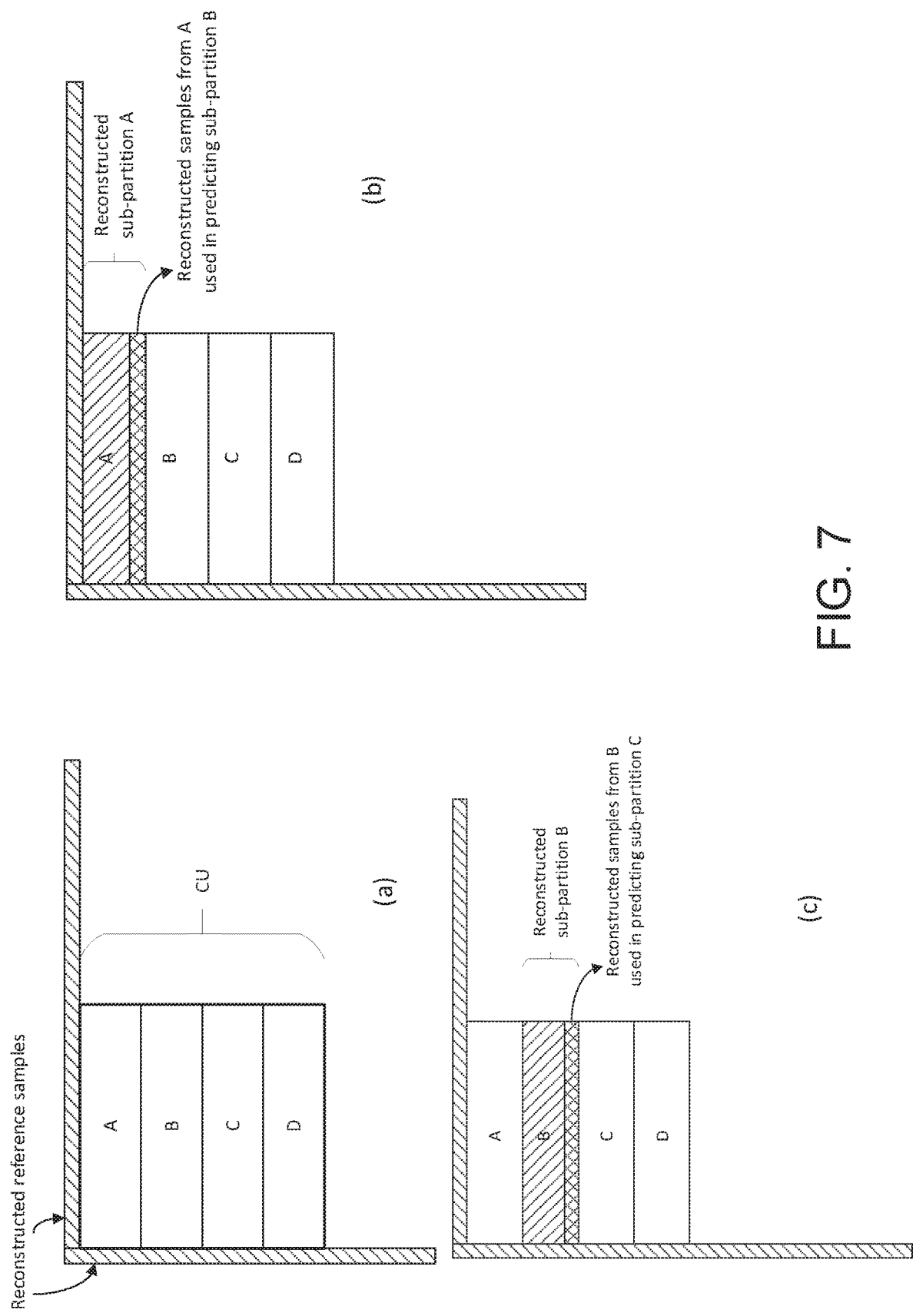
FIG. 7 illustrates diagrams (a), (b), and (c) of example prediction in Intra sub-partitions (ISP).

For a horizontal split, the sub-partitions may be processed from top to bottom. For a vertical split, the sub-partitions may be processed from left to right. A sub-partition may be predicted, and a residual may be added to the predicted sub-partition, for example, to generate a reconstructed sub-partition. The samples from the reconstructed sub-partition may be used to predict the next sub-partition. FIG. 7 show diagrams of example prediction in Intra sub-partitions (ISP). In FIG. 7(*a*)-(*c*), sub-partitions that are split horizontally may be processed. FIG. 7(*a*) illustrates a CU comprising four sub-partitions A, B, C, and D. FIG. 7(*b*) illustrates sub-partition A may be predicted and reconstructed, and one or more samples in the bottom row of reconstructed sub-partition A may be used to predict sub-partition B. FIG. 7(*c*) illustrates sub-partition B may be predicted and reconstructed, and one or more samples in the bottom row of reconstructed sub-partition B may be used to predict sub-partition C. As illustrated in FIG. 7(*b*), sub-partition A (e.g., the top-most sub-partition) may be predicted using the above and left reference samples of the CU. Sub-partition A may be reconstructed by adding a residual obtained after one or more of entropy decoding, inverse quantization, and inverse transform. One or more samples in the bottom row of reconstructed sub-partition A may be used to predict sub-partition B, followed by the reconstruction of sub-partition B. The prediction and the reconstruction may be repeated for subsequent sub-partitions.

Figure 8:
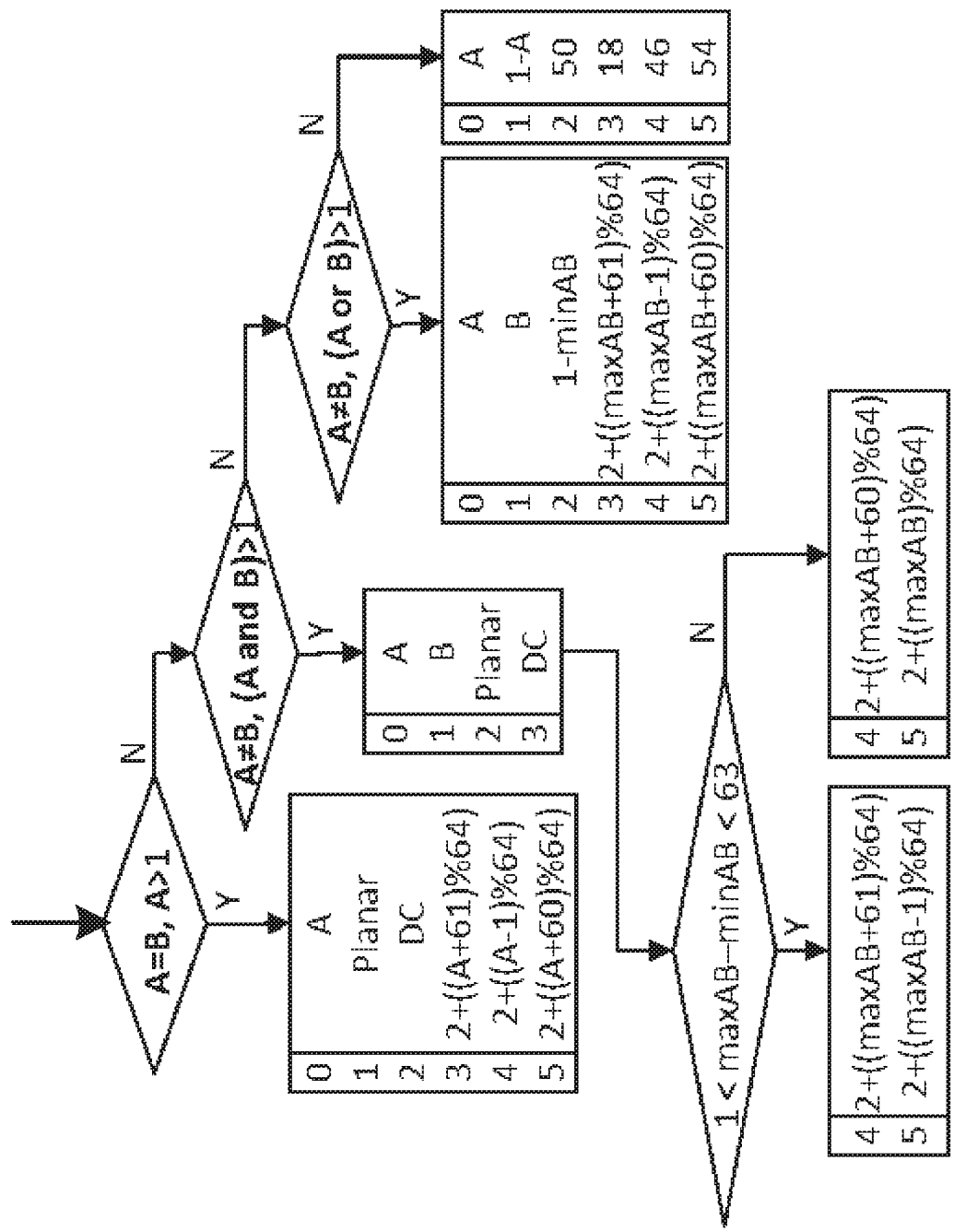
FIG. 8 is an example flow chart for most probable mode (MPM) list construction for reference line zero intra prediction.
Figure 9:
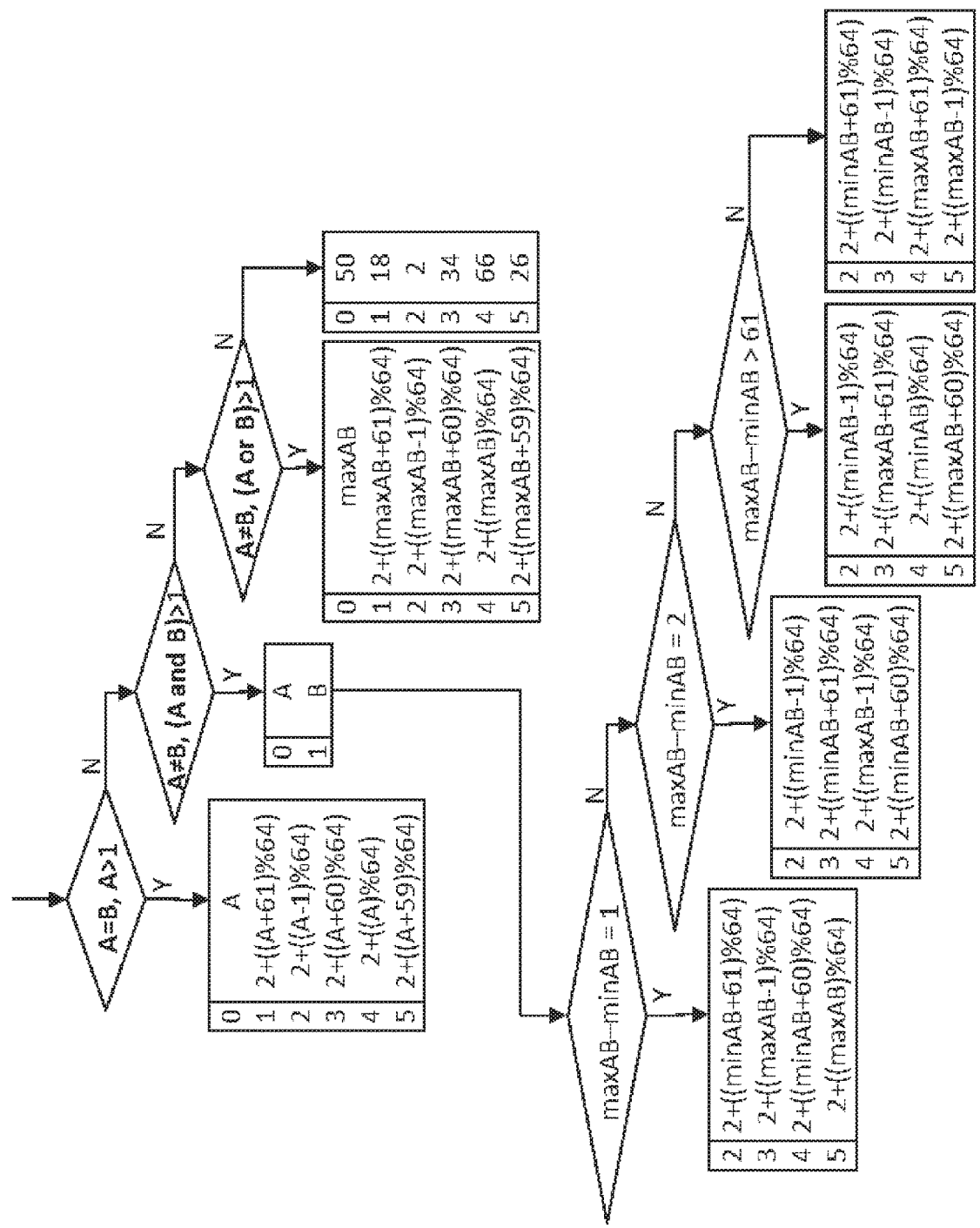
FIG. 9 is an example flow chart for MPM list construction for multiple reference line intra prediction.
Figure 10A:
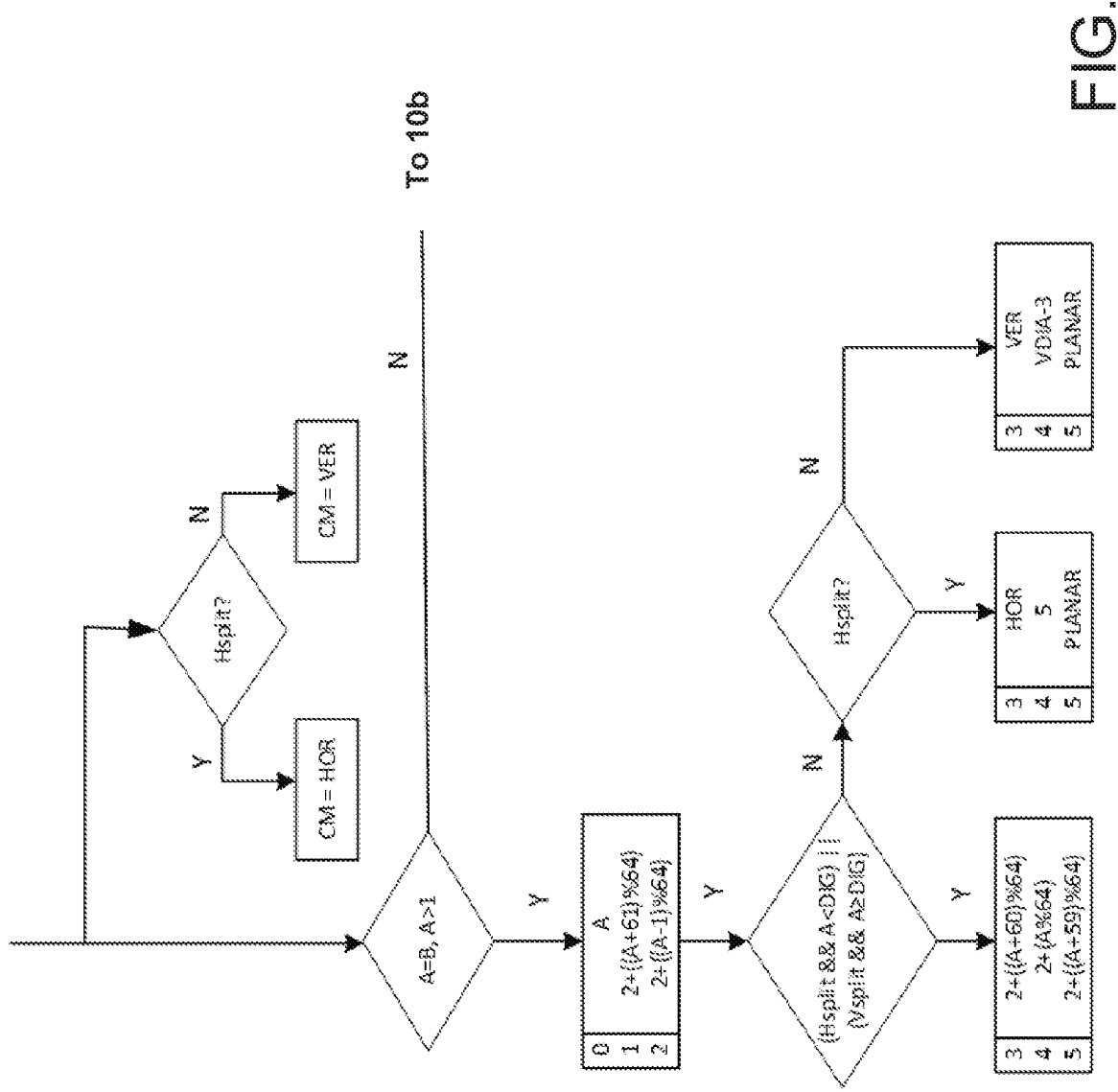
FIG. 10a-10c illustrates an example flow chart for MPM list construction for ISP.
Figure 10B:
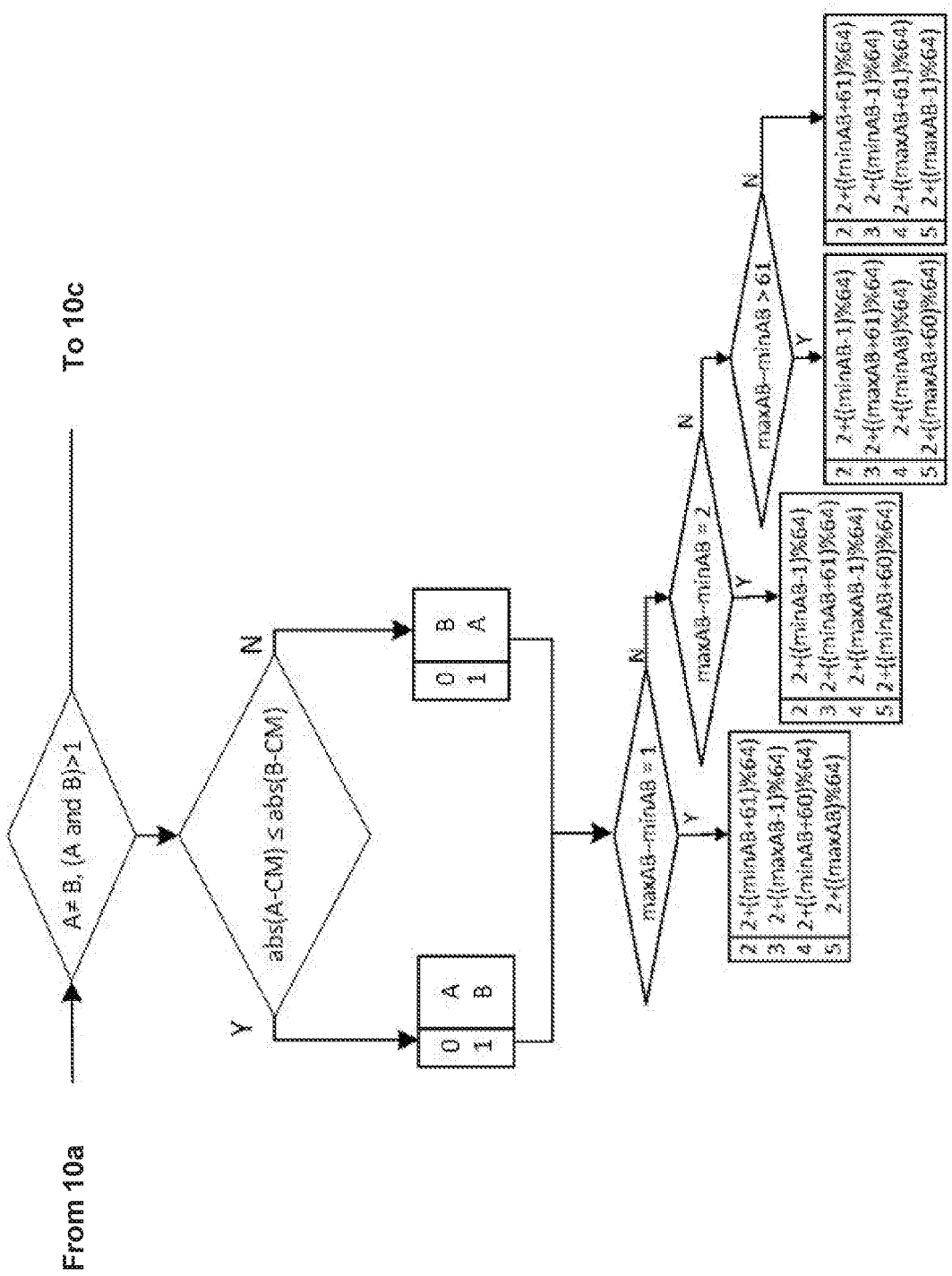
Figure 10C:
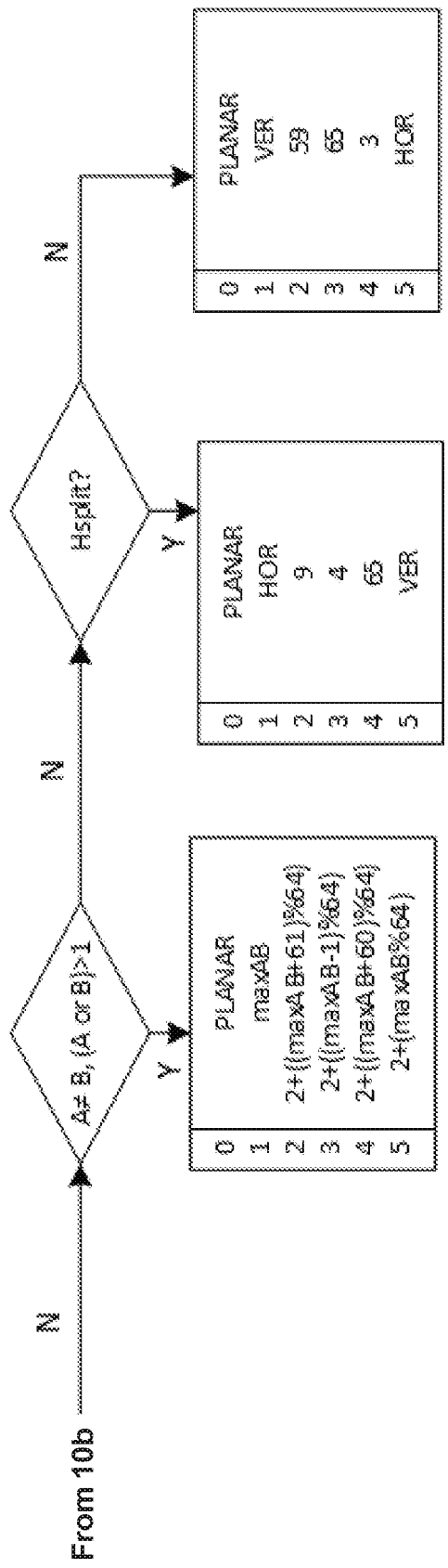

A respective MPM list (e.g., a separate MPM list of size six) may be maintained for reference line zero intra prediction, multiple reference line intra prediction, and ISP. The MPM list may be maintained to indicate (e.g., signal) the intra mode to be used. The MPM list construction utilized for the reference line zero intra prediction, multiple reference line intra prediction, and ISP may be distinct, for example, as illustrated in FIG. 8, FIG. 9, and FIG. 10*a*-10*c*. FIG. 8 is an example flow chart for MPM list construction for reference line zero intra prediction. FIG. 9 is an example flow chart for MPM list construction for multiple reference line intra prediction. FIG. 10*a*-10*c* illustrate an example flow chart for MPM list construction for ISP. The MPM list construction (e.g., as illustrated in FIG. 8, FIG. 9, and FIG. 10*a*-10*c*) may consider the intra mode of neighboring left CU (denoted as 'A'), and/or the intra mode of the above CU (denoted as 'B') during the list construction. Multiple conditions (e.g., four conditions) may be examined, for example, using intra modes 'A' and 'B'. An MPM list may be generated if a condition is satisfied. For example, each satisfying condition may result in a separate MPM list. Table 1 illustrates an example of four conditions that may be used in the MPM list construction (e.g., the three MPM list construction as indicated in FIG. 8, FIG. 9, and FIG. 10*a*-10*c*), and their corresponding logical conditions (in terms of the intra modes A and B).

TABLE 1

Example conditions used in MPM list construction illustrated in FIG. 8, FIG. 9, and FIG. 10a-10c

| # | Condition | Equivalent logical condition |
|---|---|---|
| 1 | Both A and B are sufficiently similar, and both are angular modes | (A = B) && (A > 1) |
| 2 | A and B are different, and both are angular modes | (A ≠ B) && (A and B) > 1 |
| 3 | A and B are different, and either is an angular mode | (A ≠ B) && (A or B) > 1 |
| 4 | Default (none of the above conditions are satisfied) | |

As illustrated in FIG. 8, FIG. 9, and/or FIG. 10a-10c, an MPM list may comprise indices (e.g., from zero to five) and their associated intra modes. An index closer to zero may be closer to the top of the MPM list. For example, as illustrated in FIG. 8, the default condition may yield an MPM list comprising intra mode 'A' as its zeroth element. The minimum and maximum of 'A' and 'B' are denoted as minAB and maxAB, respectively, and '%' denotes the modulus operator. As illustrated in FIG. 10a-10c, in ISP for example, the type of split (e.g., horizontal split or vertical split) may be considered in the MPM construction.

Figure 11:
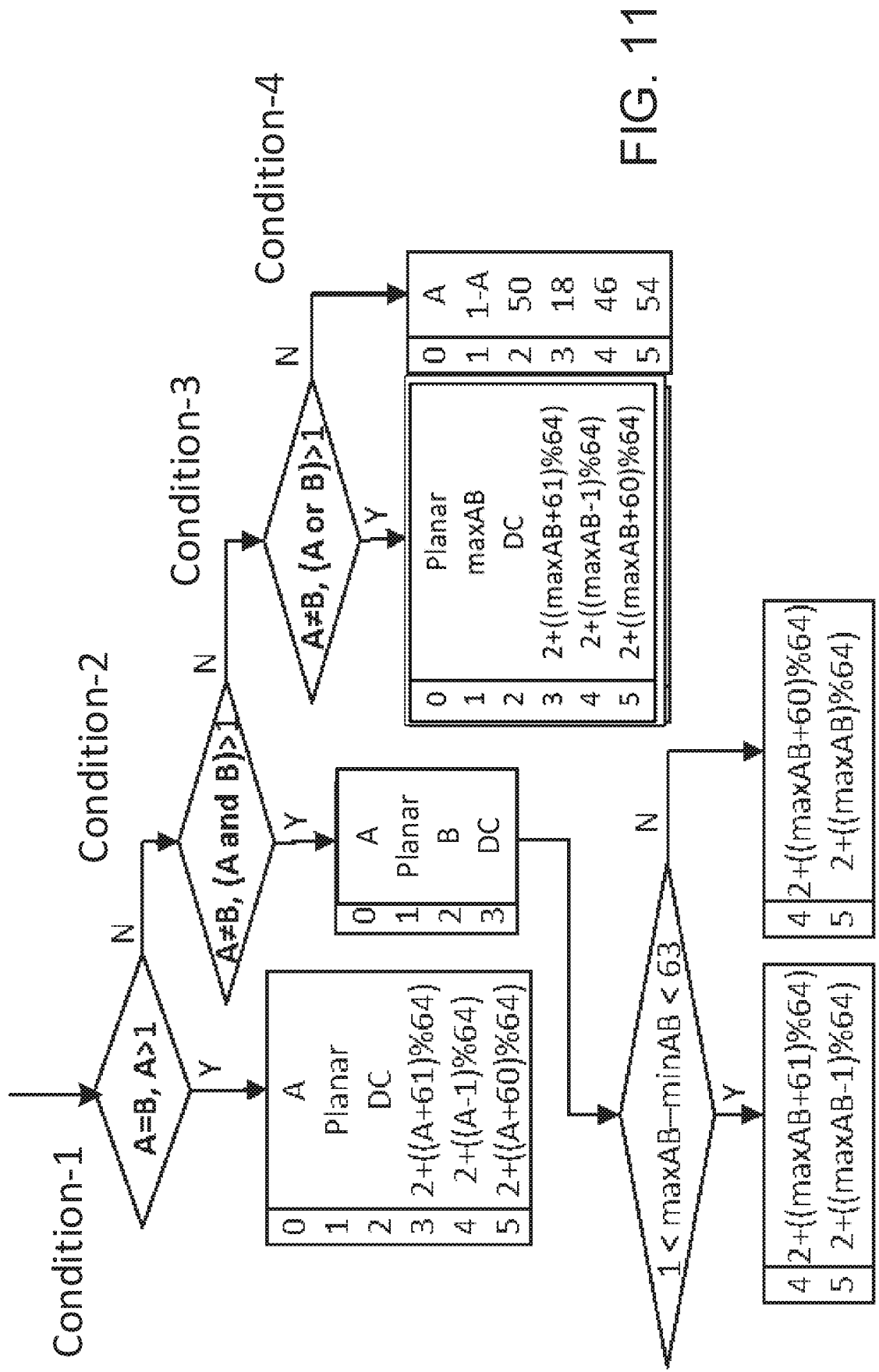
FIG. 11 is an example flow chart for unified MPM list construction.

FIG. 11 is an example flow chart for unified MPM list construction. FIG. 11 illustrates a unified MPM list construction for multiple intra coding tools (e.g., the reference line zero intra prediction, multiple reference line intra prediction, and ISP). Unified MPM list may be modified for multiple reference line intra prediction and ISP. In case of multiple reference line intra prediction, DC mode and planar mode may be skipped from the unified MPM list, for example, since DC and planar modes are not used for multiple reference line intra prediction. In case of ISP, the DC mode may be skipped from the unified MPM list or replaced by an angular mode in the unified MPM list, for example, since DC mode is not be used for ISP.

In ISP, sub-partitions may be predicted (e.g., successively predicted) and reconstructed from top-to-bottom or left-to-right based on an ISP split type. For example, sub-partitions may be predicted and reconstructed from top-to-bottom when a horizontal split is used. Sub-partitions may be predicted and reconstructed from left-to-right when a vertical split is used. A sub-partition (e.g., a subsequent sub-partition) may be predicted, for example, when the previous sub-partition has been reconstructed. In some examples, sub-partition prediction may be independent of the reconstruction of a neighboring or a previous sub-partition. Latency may be reduced.

An MPM list construction process(es) may correspond to reference line zero intra prediction, multi reference line intra prediction, and ISP. In examples, respective MPM list construction processes for different intra coding tools (e.g., reference line zero intra prediction, multi reference line intra prediction, and ISP) may be unified. A unified MPM list may be based on multiple conditions. An MPM list may change upon meeting a respective condition. For example, each condition may yield a different MPM list. The unified MPM list may be constructed.

Systems, methods, and instrumentalities are disclosed for implementing the ISP, for example, by reducing the latency in ISP and/or simplifying the MPM list construction process. In some examples, a subsequent sub-partition may be predicted using prediction samples from previous neighboring sub-partition. In some examples, a subsequent sub-partition may be predicted using predicted samples or reconstructed samples from previous neighboring sub-partition. One or more examples herein with respect to horizontal partitioning may also be applicable to vertical partitioning. In vertical partitioning, the relevant rows may be replaced by columns, and the relevant bottom row may be replaced with right column. One or more examples herein may reduce latency.

Previous sub-partition prediction samples may be used as reference samples for prediction. ISP may perform prediction and reconstruction of sub-partitions successively. In some examples, prediction of sub-partitions may not depend on the reconstructed samples from its neighboring sub-partition. A first sub-partition may be predicted using the above reference row and left reference column adjoining a CU. The first sub-partition may be the top-most sub-partition for horizontal split. The first sub-partition may be the left-most sub-partition for vertical split. Prediction may be performed for the remaining sub-partitions.

Figure 12:
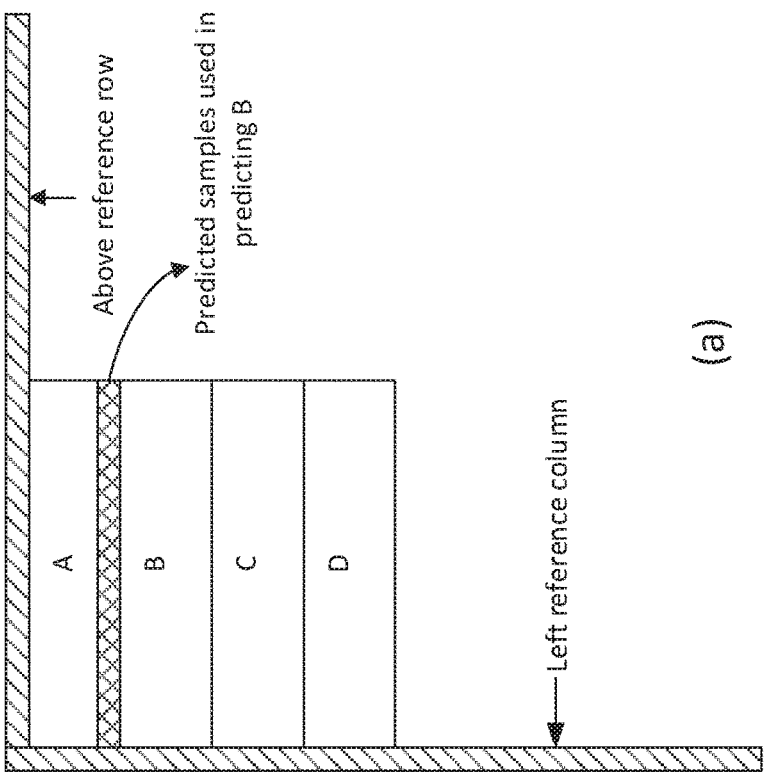
FIG. 12 illustrates diagrams (a) and (b) of example CU-based prediction, where bottom rows of sub-partitions A, B, and C are predicted using above and left reference lines adjoining a CU.
Figure 12:
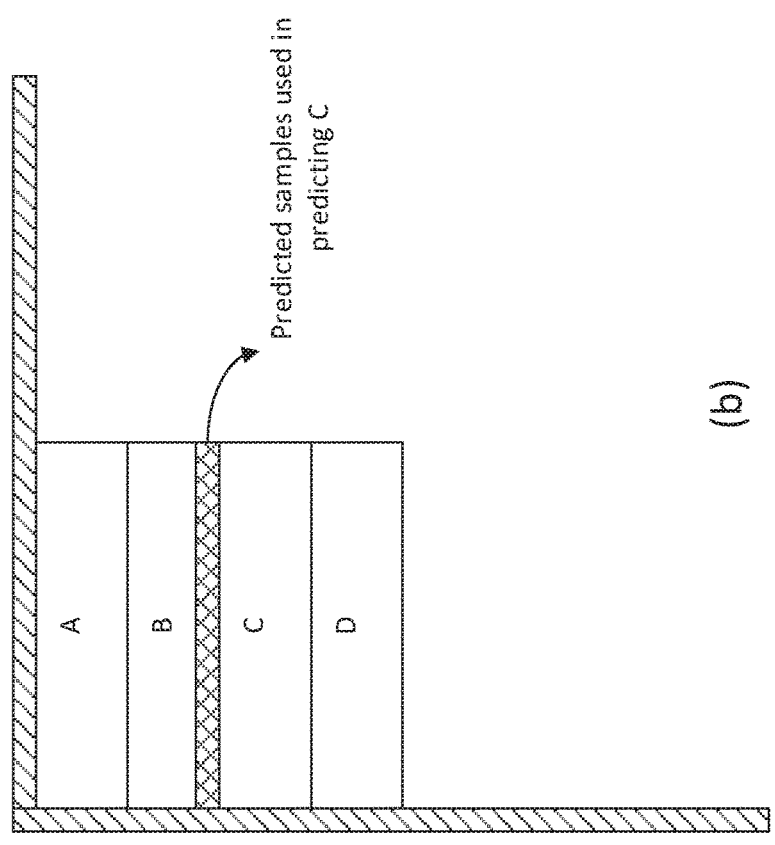

CU-based prediction may be performed, for example, to predict sub-partitions, transform units (TUs), or prediction units (PUs). For example, if N denotes the number of sub-partitions in a CU, in CU-based prediction, the prediction may be performed as follows. A bottom row (e.g., for horizontal split) or a right column (e.g., for vertical split) for each of the first N−1 sub-partitions may be predicted. FIG. 12 including (a) and (b) illustrates an example CU-based prediction, where bottom rows of sub-partitions A, B, and C may be predicted using samples in the above and left reference lines adjoining a CU. As illustrated in FIG. 12, a CU may be horizontally split into four sub-partitions A, B, C and D. The bottom row of each of the first three sub-partitions A, B, and C may be predicted, for example, as illustrated in FIGS. 12 (a) and (b). These rows (or columns in case of vertical split) may be predicted using the above reference row and left reference column adjoining a CU. These rows (or columns in case of vertical split) may be predicted with the prediction mode same as the intra mode of the CU. The predicted rows (or columns) may be used to predict the neighboring sub-partitions. For example, as illustrated in FIG. 12 (b), the predicted bottom row samples of sub-partition B may be used to predict sub-partition C. Each of the sub-partitions of a CU (e.g., N−1 sub-partitions) may be predicted.

The reconstruction may be performed on a sub-partition basis or on an entire CU, for example, once the prediction is completed. If the reconstruction is performed on a sub-partition basis, the residuals may be generated by applying inverse quantization and inverse transform on a sub-partition-basis. If the reconstruction process is performed on a CU (e.g., an entire CU), the residuals may be generated for the entire CU. CU-based prediction may reduce latency, for example, for ISP.

Figure 13:
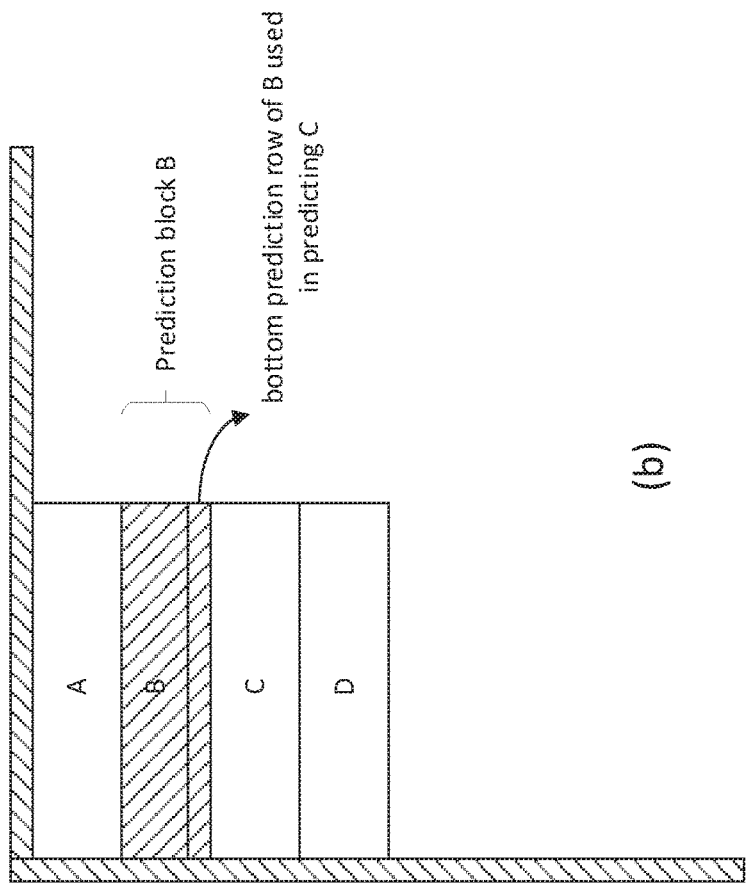
FIG. 13 illustrates diagrams (a) and (b) of example sub-partition-based prediction, wherein (a) bottom row of predicted sub-partition A is used in predicting B, and (b) bottom row of sub-partition B is used in predicting sub-partition C.
Figure 13:
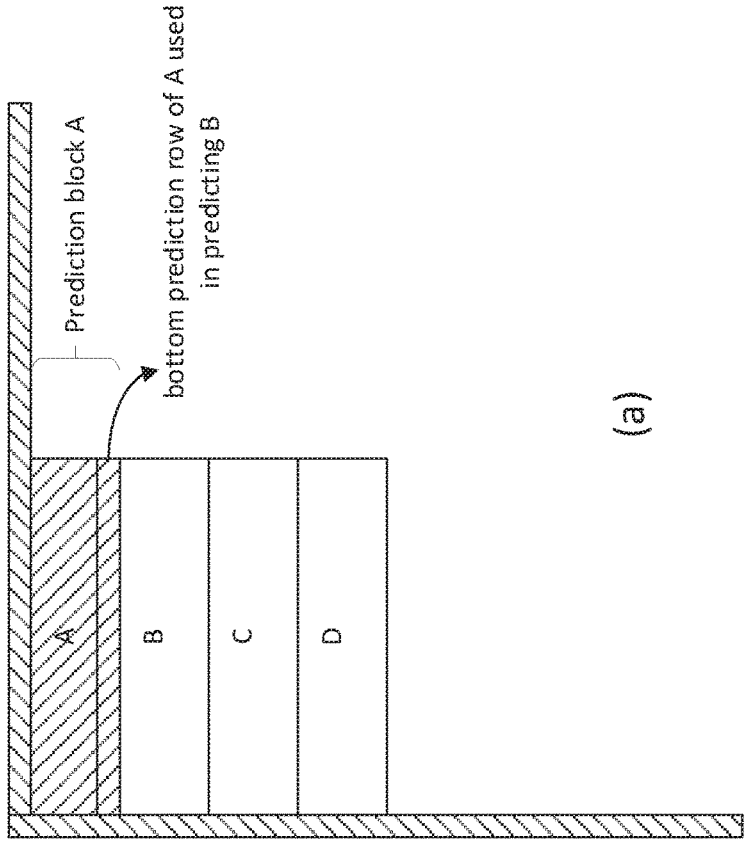

Sub-partition-based prediction may be performed. The prediction of sub-partitions may be performed successively using, for example, the prediction samples from previous sub-partitions. FIG. 13 illustrates an example of a sub-partition-based prediction. As illustrated in FIG. 13, a CU may be horizontally split into four sub-partitions A, B, C and D. As illustrated in FIG. 13, the first sub-partition may be predicted using the above reference row and left reference column adjoining a CU. In an example, a first sub-partition may be the top-most sub-partition A. As illustrated in FIG. 13 (a) the prediction samples from the bottom row of A, with the left reference column, may be used to predict the sub-partition B. Referring to FIG. 13(b), the bottom row prediction samples of sub-partition B (e.g., together with the left reference column) may be used to predict sub-partition C. The process may be repeated until the last sub-partition is predicted. Sub-partition-based prediction as illustrated in FIG. 13 may be performed on sub-partitions that are split vertically.

The reconstruction may be performed on a sub-partition basis or on an entire CU, for example, once the prediction is completed. If the reconstruction is performed on a sub-partition basis, the residuals may be generated by applying inverse quantization and inverse transform on a sub-partition-basis. If the reconstruction process is performed on a CU (e.g., an entire CU), the residuals may be generated for the entire CU. CU-based prediction may reduce latency, for example, for ISP.

Figure 14A:
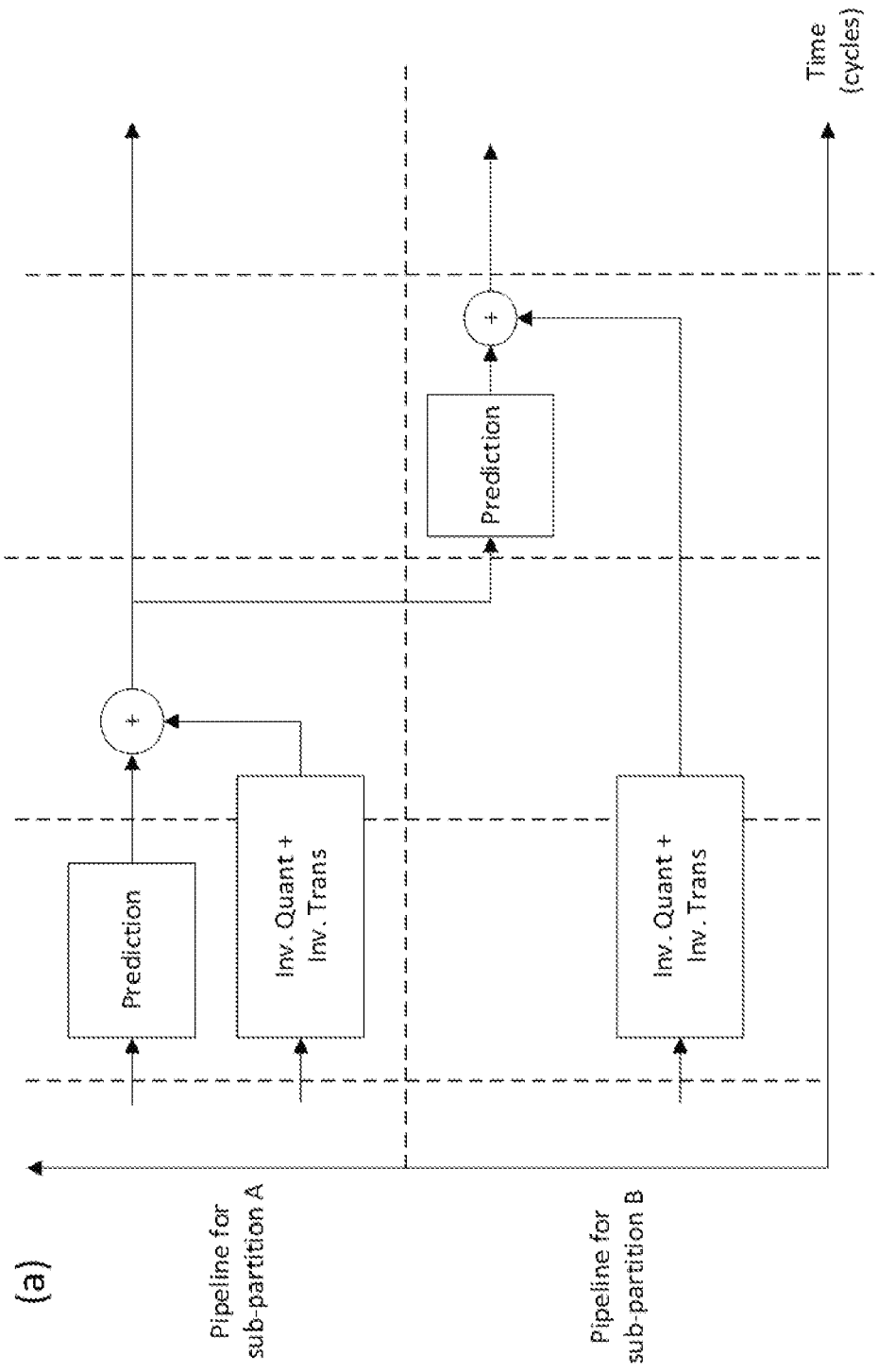
FIG. 14(a) is a diagram of an example of pipeline stages for ISP.
Figure 14B:
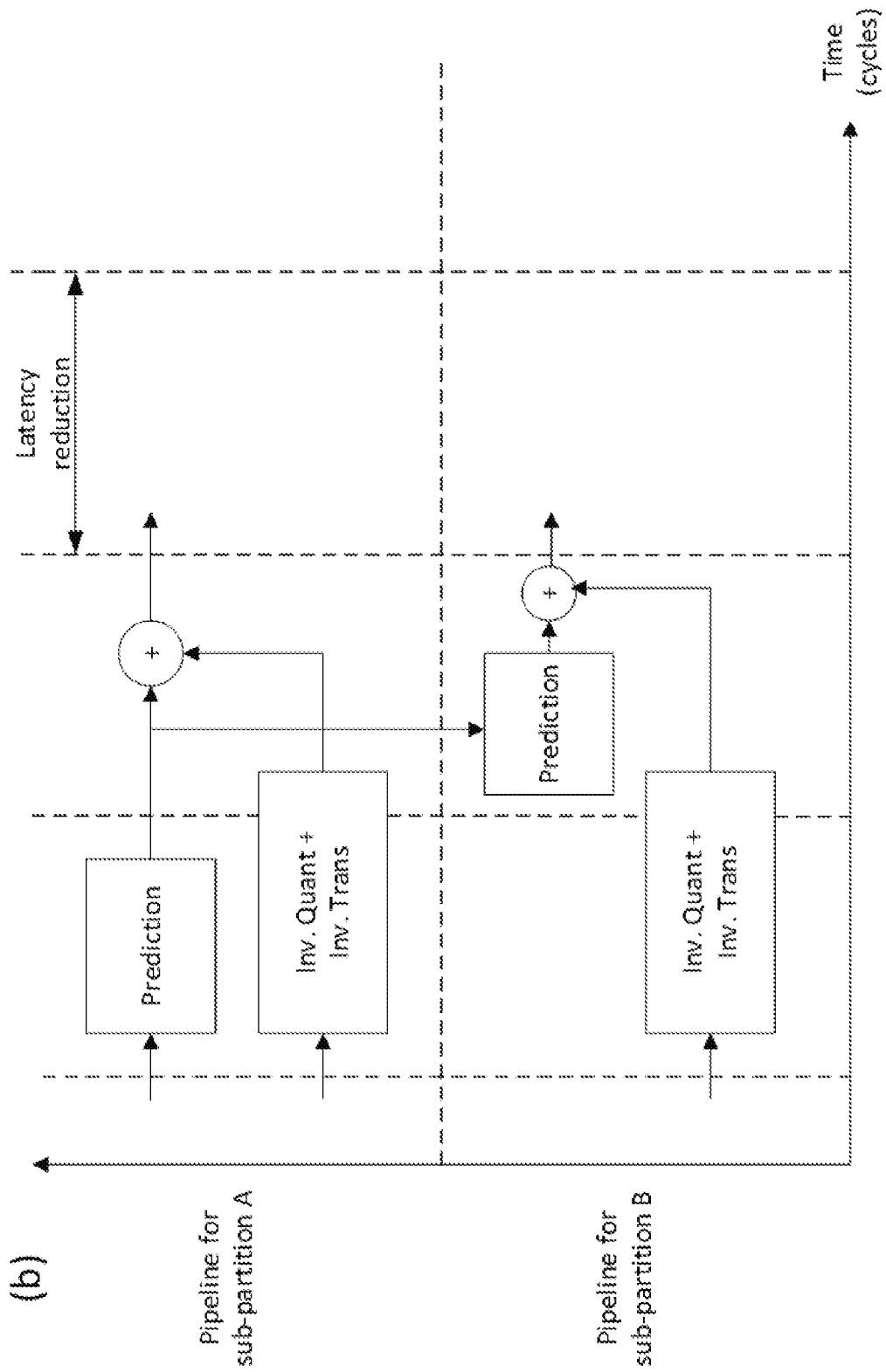
FIG. 14(b) is a diagram of an example of pipeline stages for ISP using sub-partition-based prediction
Figure 14C:
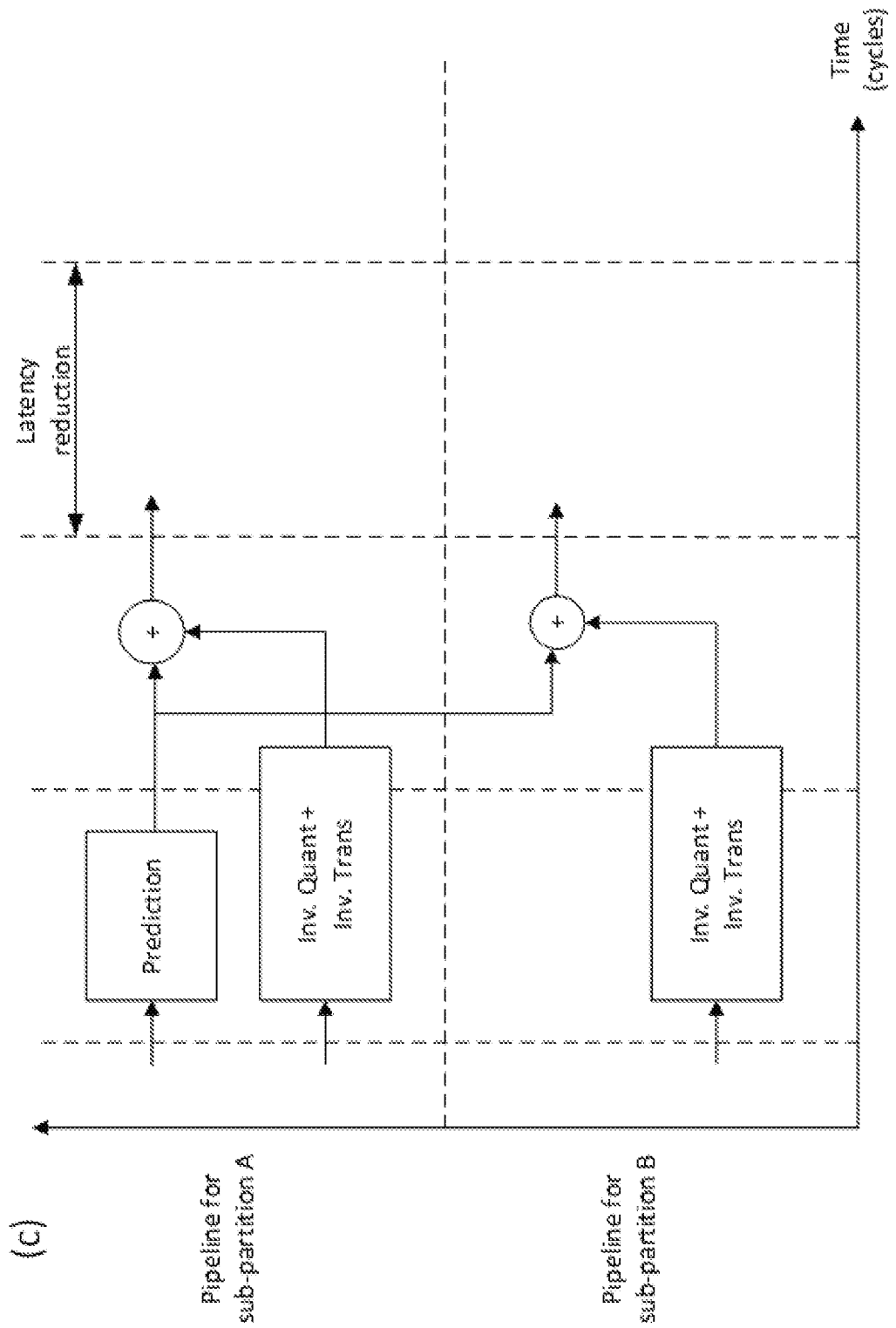
FIG. 14(c) is a diagram of an example of pipeline stages for ISP using multiple sub-partition based prediction or multi-sub-partition based prediction.

FIG. 14(a)-(c) are diagrams of an example of pipeline stages for (a) ISP, (b) ISP using sub-partition-based prediction, and (c) ISP using multiple sub-partition based prediction or multi-sub-partition based prediction. FIG. 14(a) and FIG. 14(b) illustrate a pipeline for ISP, and a pipeline for ISP that may utilize sub-partition-based prediction, when considering a CU with sub-partitions A and B. FIG. 14(a) and FIG. 14(b) illustrate the stages of the pipeline: prediction; inverse quantization and inverse transform; and reconstruction. FIG. 14(c) illustrates the pipeline stage of multi-sub-partition intra-prediction based ISP (e.g., versus original ISP). The prediction of sub-partition B may not depend upon the reconstruction of sub-partition A. Latency reduction may be achieved, for example, as illustrated in FIG. 14(a)-(c).

Figure 15:
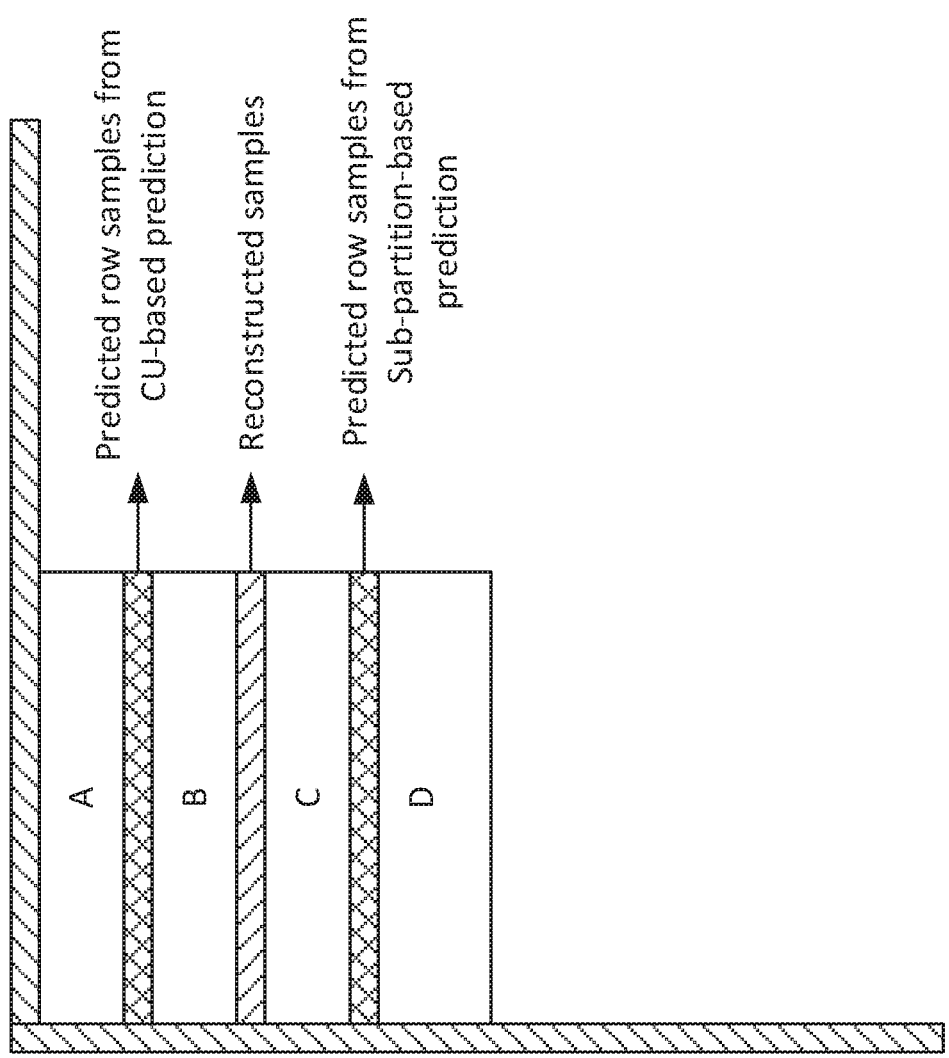
FIG. 15 is a diagram of an example of hybrid prediction, where a sub-partition may be predicted using reconstructed samples or prediction samples from a neighboring sub-partition.

Hybrid prediction may be performed, for example, to predict sub-partitions, TUs, or PUs. A sub-partition may be predicted utilizing predicted samples from a neighboring sub-partition or reconstructed samples from a neighboring sub-partition. For predicted samples, CU-based prediction or sub-partition-based prediction may be utilized. FIG. 15 illustrates an example of hybrid prediction, where a sub-partition may be predicted using reconstructed samples or prediction samples from a neighboring sub-partition. As illustrated in FIG. 15, the bottom row of sub-partition A may be predicted, for example, using CU-based prediction as described herein. Residuals of sub-partitions A, B, C, and D may be determined, for example, by utilizing inverse quantization and inverse transform operations. Sub-partitions A and B may be predicted, for example, after the residuals are obtained. Sub-partition A may be predicted using the above reference row and left reference column adjoining a CU. Sub-partition B may be predicted using the bottom predicted row of sub-partition A and the left reference column of the CU. Sub-partition A and sub-partition B may be reconstructed. Bottom reconstructed row of sub-partition B and the left reference column may be used to predict sub-partition C. Bottom predicted row of sub-partition C and the left reference column may be used to predict sub-partition D, for example, using sub-partition-based prediction as described herein.

The last sub-partition may be predicted from reconstructed samples from an adjoining sub-partition, for example, as described herein. For example, the last sub-partition may be farthest away from one of the reference lines. In the horizontal split, the bottom sub-partition may be farthest away from the above reference row. Accuracy of prediction of the last sub-partition may be improved.

Figure 16:
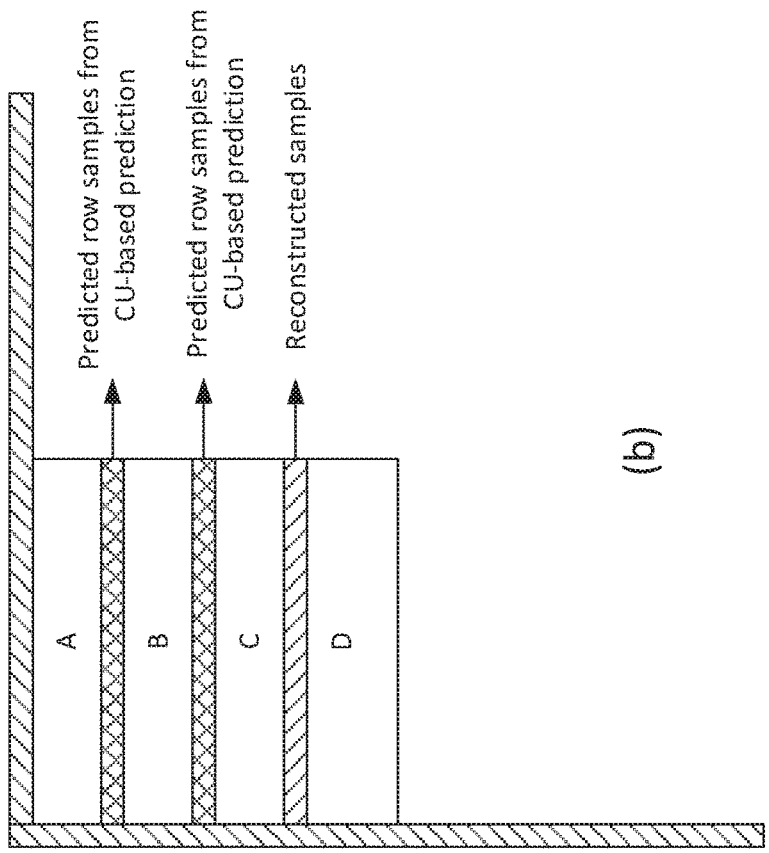
FIG. 16 illustrates diagrams (a) and (b) of example hybrid prediction.
Figure 16:
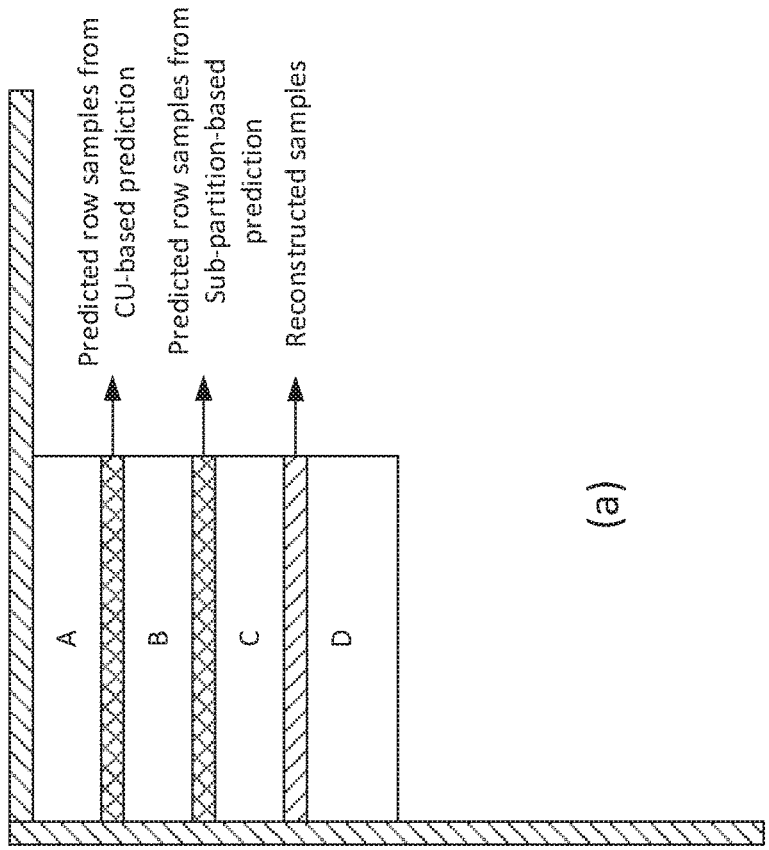

A hybrid prediction may be used for predicting a CU. For example, some sub-partition(s) of a CU may be predicted based on reconstructed samples of another sub-partition(s), and some sub-partition(s) of the CU may be predicted based on prediction samples of other sub-partition(s). FIG. 16 illustrates examples of hybrid prediction. In FIG. 16, sub-partition D may be predicted from bottom row reconstructed samples of sub-partition C. A sub-partition-based prediction and/or CU-based prediction may be used. As illustrated in FIG. 16(a), sub-partition C may be predicted from bottom row prediction samples of sub-partition B by utilizing sub-partition-based prediction. As illustrated in FIG. 16(b), sub-partition C may be predicted from bottom row prediction samples of sub-partition B by utilizing CU-based prediction.

A prediction type (e.g., CU-based prediction, sub-partition-based prediction, or hybrid prediction) may be selected based on the CU size. For example, for larger CUs (e.g., CUs of size greater than 16×16 pixels), hybrid prediction may be used. For smaller CUs (e.g., CUs of size up to 16×16 pixels), the sub-partition-based prediction may be used.

A prediction type may be selected based on the intra mode. For intra angular modes, the sub-partition-based prediction may be used, while for non-angular modes, the CU-based prediction may be used.

One or more of the prediction types described herein may be used with regular ISP prediction where prediction and reconstruction of sub-partitions are performed successively (e.g., from top to bottom or from left to right). Sub-partition-based prediction as described herein may be applied to relatively small CUs, for example, CUs of size 8×4 pixels or 4×8 pixels, and regular ISP may be used for larger CUs (e.g., CUs of size greater than 8×4 pixels or 4×8 pixels). In some cases, sub-partition-based prediction may be applied to the different CU sizes (e.g., small CUs and large CUs). In an example, regular ISP may be disabled for relatively small CUs, for example, CUs of size 8×4 pixels and 4×8 pixels, while ISP may be applied to larger CUs (e.g., CUs of size greater than 8×4 pixels and 4×8 pixels).

In an example, samples used for predicting a sub-partition may be adaptively chosen. For example, the chosen samples may be reconstructed samples, predicted samples from CU-based prediction, predicted samples from sub-partition-based prediction. An index may be signaled to a video decoding device in a bitstream. The index may be signaled per CU. The index may indicate the choice of samples used by the video encoding device. Table 2 illustrates an example of choices available in an adaptive scheme, for example, when considering a CU with four sub-partitions. As illustrated in Table 2, index two uses CU-based prediction for sub-partition B, sub-partition-based prediction for sub-partition C, and reconstruction samples-based prediction (e.g., ISP) for sub-partition D. As illustrated in Table 2, the adaptive scheme may restrict sub-partition A to use ISP, and sub-partition B to use CU-based prediction. As further illustrated in Table 2, the number of choices in the adaptive scheme may be restricted to a subset of choices listed. The signaling overhead for an index may be reduced. For example, the number of choices may be restricted to four choices corresponding to indices 0, 1, 2, and 4 as shown in Table 2. Prediction accuracy for the last sub-partition D may improve with these restricted choices.

TABLE 2

Adaptive scheme listing different choices for sub-partition prediction. Sub-partition A may use ISP. Following notations are used in Table 2: CU: CU-based prediction; sub-part: sub-partition-based prediction; and recon: prediction from reconstructed samples.

| index | Sub-partition B | Sub-partition C | Sub-partition D |
| --- | --- | --- | --- |
| 0 | CU | recon | recon |
| 1 | CU | CU | recon |
| 2 | CU | sub-part | recon |
| 3 | CU | recon | CU |
| 4 | CU | recon | sub-part |
| 5 | CU | CU | sub-part |
| 6 | CU | sub-part | CU |
| 7 | CU | sub-part | sub-part |
| 8 | CU | CU | CU |

Figure 17:
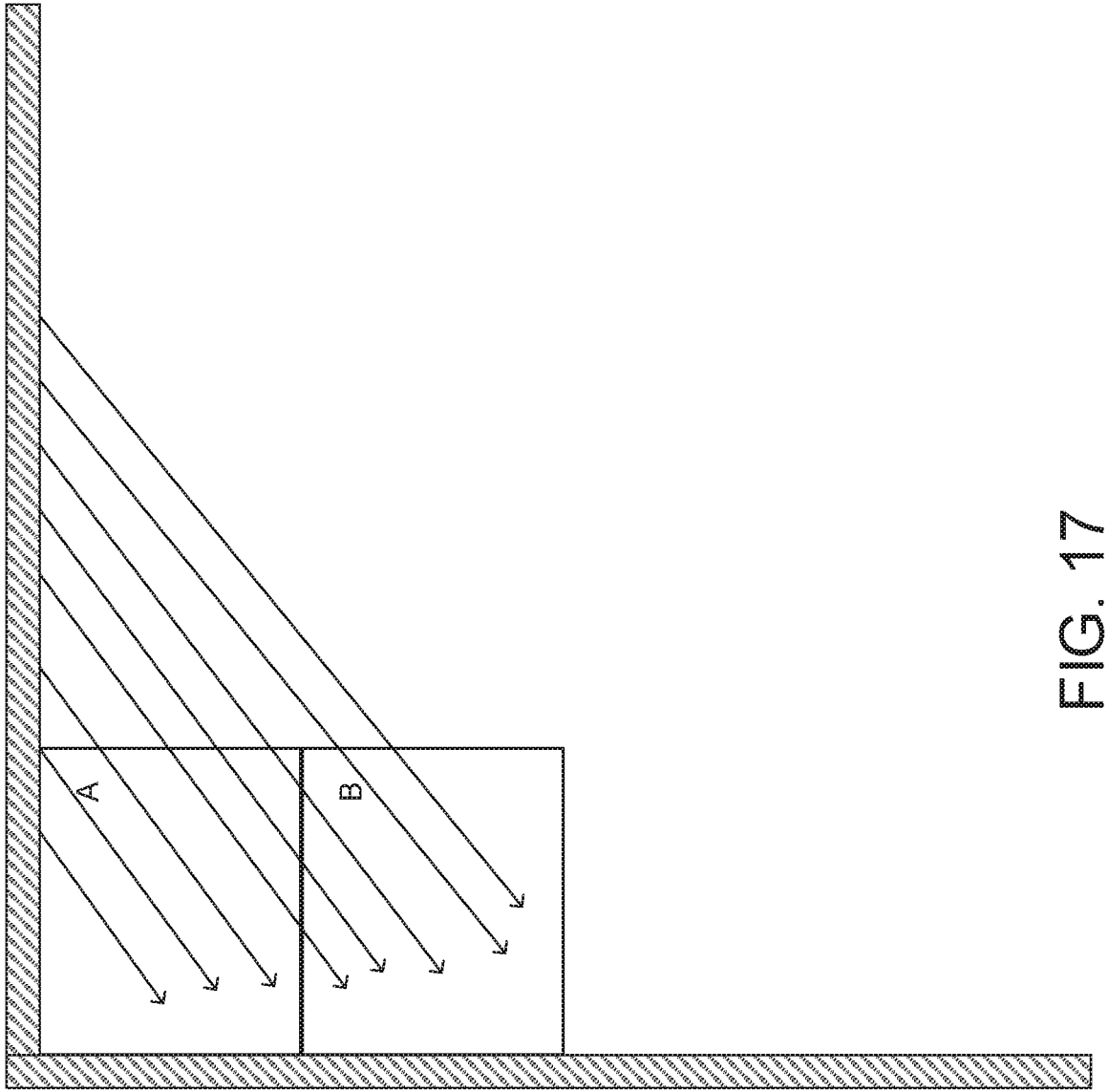
FIG. 17 illustrates an example of multiple sub-partition based prediction or multi-sub-partition based intra-prediction.

Intra-predictions of sub-partitions may be based on reference samples that neighbor a current block, for example, CU neighboring reference samples. FIG. 17 illustrates an example of multiple sub-partition based prediction or multi-sub-partition based intra-prediction. Intra-predictions of two and more sub-partitions may be performed in parallel. As illustrated in FIG. 17, intra-predictions of two and more sub-partitions may be performed simultaneously (e.g., all at once) from the CU neighboring reference samples associated with the respective sub-partitions. The reconstruction latency of each of the ISP sub-partitions may be reduced. The reconstruction of the consecutive multiple ISP sub-partitions may be performed in parallel. FIG. 14(*c*) illustrates the pipeline stage of multi-sub-partition intra-prediction based ISP (e.g., versus original ISP).

A PU to be intra predicted may comprise a transform unit (TU). The PU and the TU may be of the same size. In some examples, one PU may comprise two or more TUs. A TU may comprise a sub-partition. By merging multiple TUs into a larger sized PU (e.g., larger than an individual TU), the PU intra prediction for the multiple TUs may be performed simultaneously. Decoding/reconstruction of the TUs may be performed in parallel. The decoding and/or processing latency for TUs may be reduced.

Figure 18:
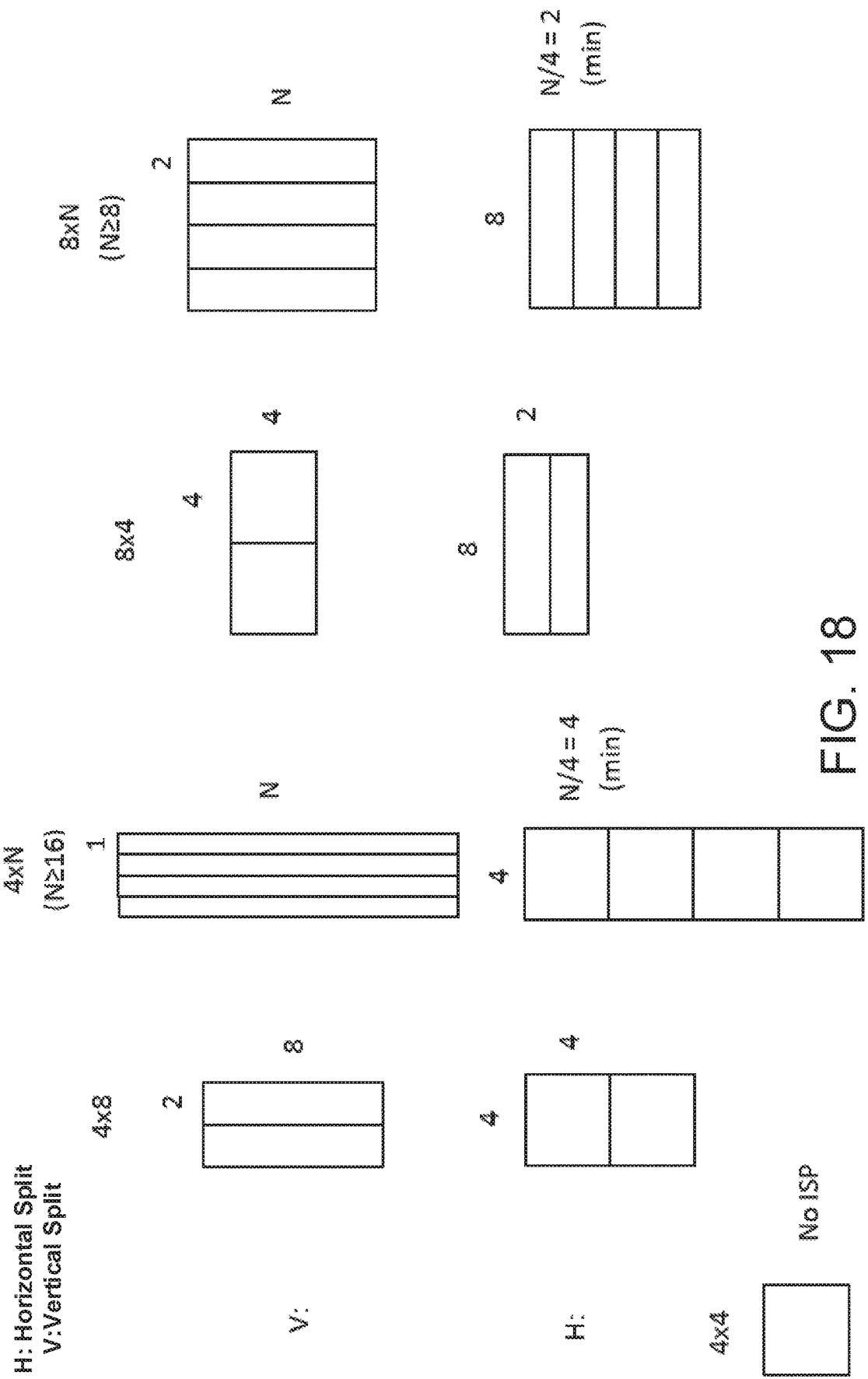
FIG. 18 illustrates various examples of ISP sub-partition of horizontal split CUs and vertical split CUs.

A device may perform one or more of CU-based intra-prediction, sub-partition-based intra-prediction, multiple sub-partition-based intra-prediction. FIG. 18 illustrates various examples of ISP sub-partition of horizontal split CUs and vertical split CUs. As illustrated in FIG. 18, ISP may be applied to CUs of various sizes. FIG. 18 provides examples of various vertical-split CUs and horizontal-split CUs, for example, 4×8, 4×N, 8×4 and 8×N. A device may receive an indication whether the sub-partition type (e.g., a type of ISP) is horizontal or vertical split. The device may perform prediction based on the vertical-split or the horizontal split, for example, according to one or more of the examples herein. Based on the indication that sub-partition type is horizontal split, the device may perform sub-partitions in the horizontal direction. Based on the indication that sub-partition type is vertical split, the device may perform sub-partitions in the vertical direction. In an example, the device may predict a prediction block based on the type of ISP.

PUs for a coding block may have a prediction block width. A prediction block width may refer to the number of samples measured from one side of the PU to the other side of the PU. A minimum prediction block width may be used in connection with the predictions of sub-partitions. One PU may comprise two or more sub-partitions (e.g., TU sub-partitions) that are vertically split or horizontally split, as illustrated in FIGS. 19C and 19D. A prediction block width may be a sub-partition width or a multiple of a sub-partition width, for example, as illustrated in FIGS. 19C and 19D. The sub-partition width and a minimum prediction block width may be used to determine a prediction block for prediction. For example, when an sub-partitioning type is a vertical split, a prediction block having multiple sub-partitions may be used for prediction when the sub-partition width is less than the minimum prediction block width. As illustrated in FIGS. 19C and 19D, the minimum prediction block width may be 4 samples. The prediction block width may be 4 samples when the sub-partition width is less than 4 samples. When the sub-partition width is equal to or greater than the minimum prediction block width, a prediction block having a sub-partition may be used for prediction. The prediction block width may be the sub-partition width.

Figure 19A:
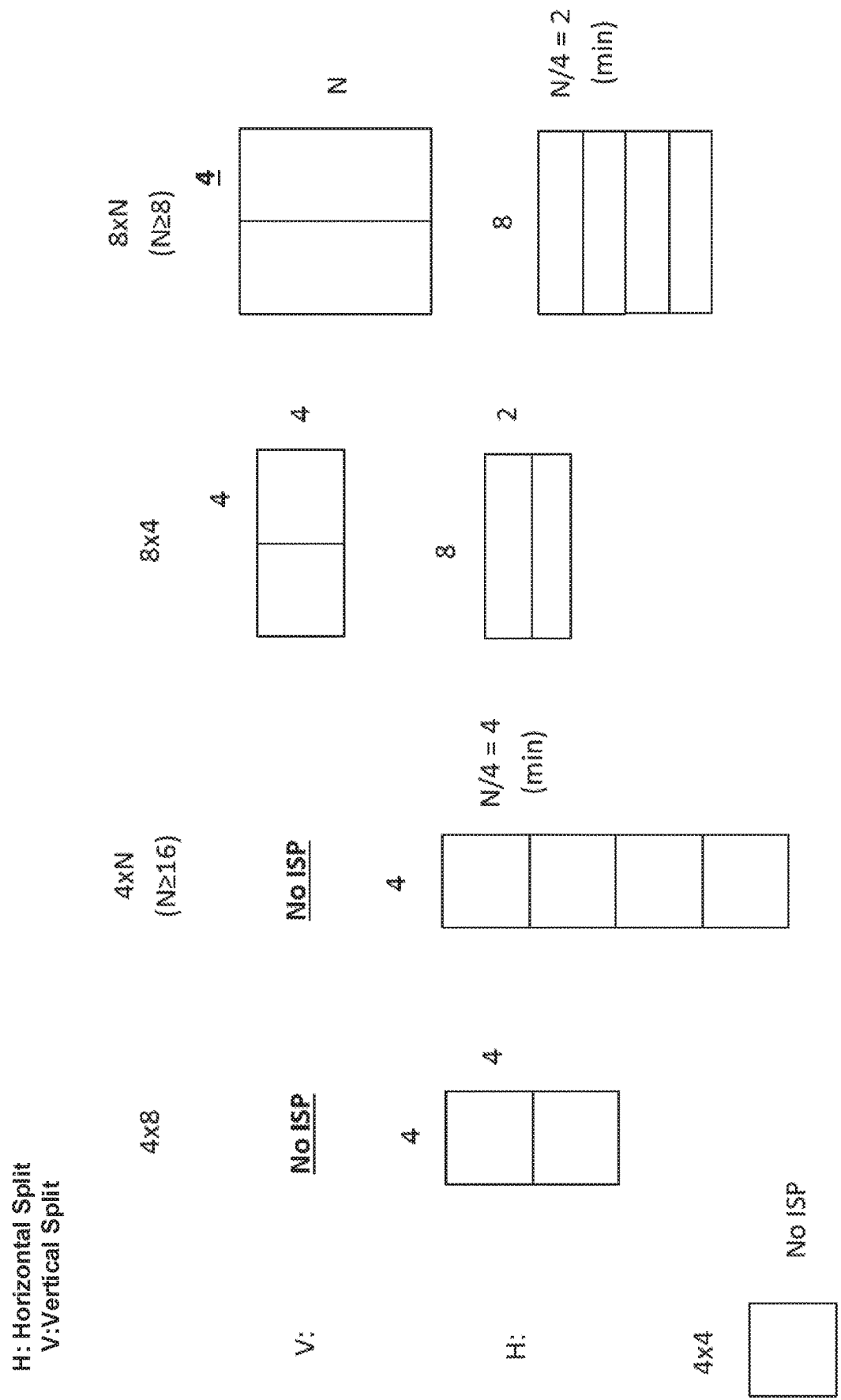
FIG. 19A illustrates an example where the 1×N (N≥16) and 2×N (N≥8) sub-partitions as illustrated in FIG. 18 may be removed and replaced with 4×N sub-partitions.

FIG. 19A illustrates an example where the 1×N (N≥16) and 2×N (N≥8) sub-partitions as illustrated in FIG. 18 may be removed and replaced with 4×N (e.g., N>8) sub-partitions. A 1×N sub-partition may represent a one-sample wide and N-sample high sub-partition. A 2×N sub-partition may represent a two-sample wide and N-sample high sub-partition. A 4×N sub-partition may represent a four-sample wide and N-sample high sub-partition.

The sub-partition width for a 4×N sub-partition is four samples. The sub-partition height for a 4×N sub-partition is N samples. The sub-partition width and/or the sub-partition height may be used for sub-partitioning the current block for intra-prediction. The sub-partition width for the current block may be determined based at least in part on whether the ISP type for the current block is a vertical split or horizontal split, as shown in FIG. 18.

The minimum prediction block width may be four samples. As described herein, a PU may comprise one or more horizontally or vertically split sub-partitions. A PU may comprise one or more 4×N sub-partitions, for example, since the 1×N (N≥16) and 2×N (N≥8) sub-partitions are replaced with 4×N sub-partitions. An ISP using multiple sub-partitions based intra-prediction may be performed in connection with the example shown in FIG. 19A. The minimum prediction block width may be used to determine a PU corresponding to a respective sub-partition.

The prediction of a prediction block may be based on CU neighboring samples and/or reconstructed sub-partitions. As illustrated in FIG. 19A, replacing 1×N (N≥16) and 2×N (N≥8) sub-partitions with 4×N sub-partitions may result in no vertical split ISP for 4×8, 4×N (N≥16) CUs. A prediction of the sub-partitions may be based on a prediction unit that is no less than 4 samples wide. The prediction of a prediction block in such 4×8 or 4×N (N≥16) CU may be based on CU neighboring samples and not based on, for example, reconstructed sub-partitions. Replacing 1×N (N≥16) and 2×N (N≥8) sub-partitions with 4×N sub-partitions may result in two 4×N vertical split sub-partitions for 8×N (N≥8) CU, as highlighted by boldfaced and underlined font. The prediction of a prediction block in such 8×N (N≥8) CU may be based on CU neighboring samples and reconstructed sub-partitions.

A PU may include multiple TU sub-partitions for certain CU sizes. A 4×8 CU may represent a four-sample wide and eight-sample high CU or coding block. A 4×N CU may represent a four-sample wide and N-sample high CU or coding block. A PU may include multiple TU sub-partitions, for example, for CU sizes of 4×8, 4×N, 8×4 and 8×N.

In one or more examples herein, CU and coding block may be used interchangeably, PU and prediction block may be used interchangeably, and TU and transform block may be used interchangeably.

In an example, a device may determine that ISP is enabled for a current block. The device may determine a sub-partition width for the current block. For a sub-partition in the current block, the device may determine a corresponding prediction block based on the sub-partition width and a minimum prediction block width. The device may predict the prediction block using reference samples that neighbor the prediction block. For example, the reference samples may include CU neighboring reference samples and/or samples from reconstructed sub-partitions.

References samples may neighbor a CU, PU, or TU. For example, references samples that neighbor a PU may include references samples that are adjacent to or spatially separate from the PU. References samples that neighbor a PU may include references samples that are in a neighboring sub-partition. References samples that neighbor a PU may include references samples that are in a neighboring CU, PU, or TU. A neighboring sub-partition may be adjacent to or spatially separate from the PU.

Figure 19B:
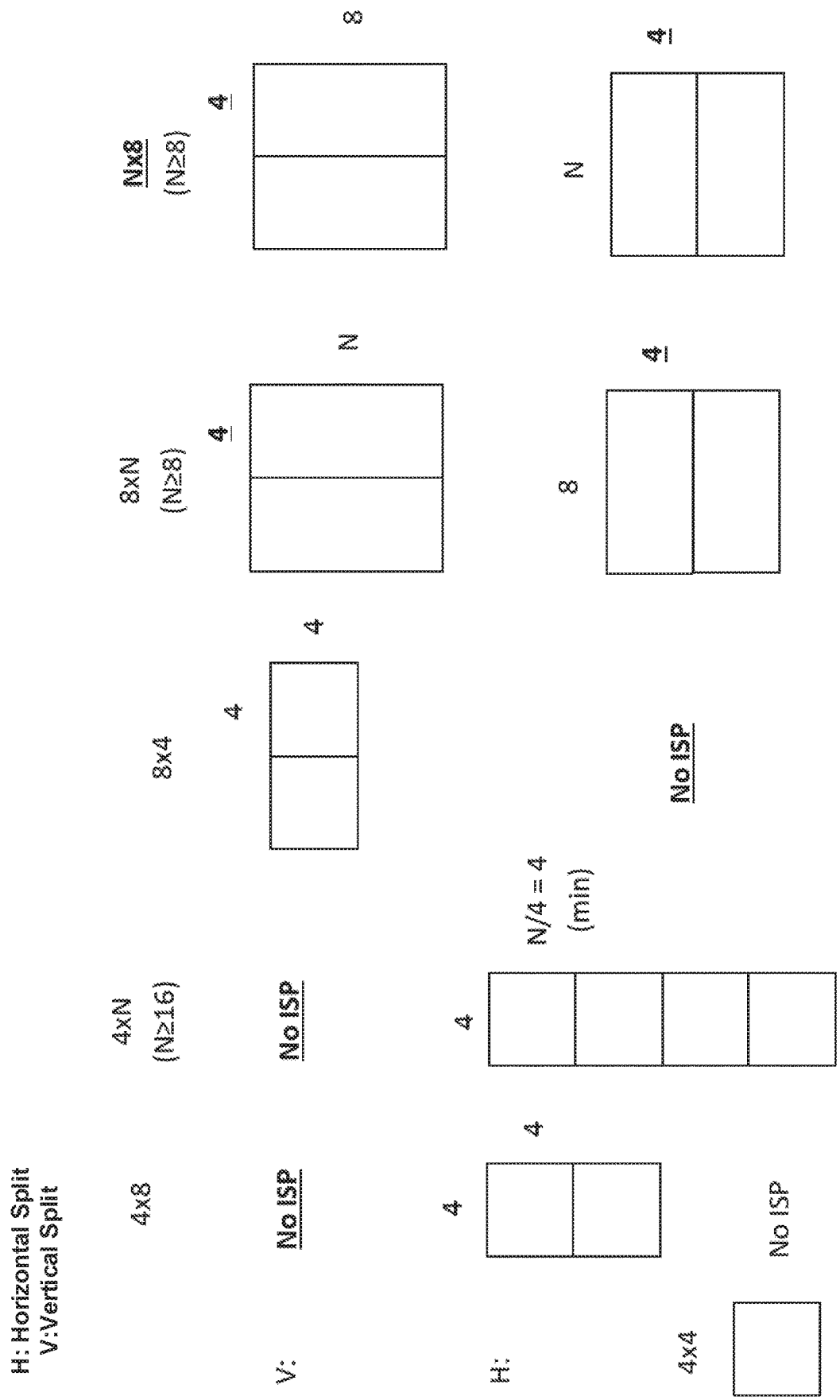
FIG. 19B illustrates an example where N×2 (N≥8) sub-partitions as illustrated in FIG. 18 may be removed and replaced with N×4 sub-partitions.
Figure 19C:
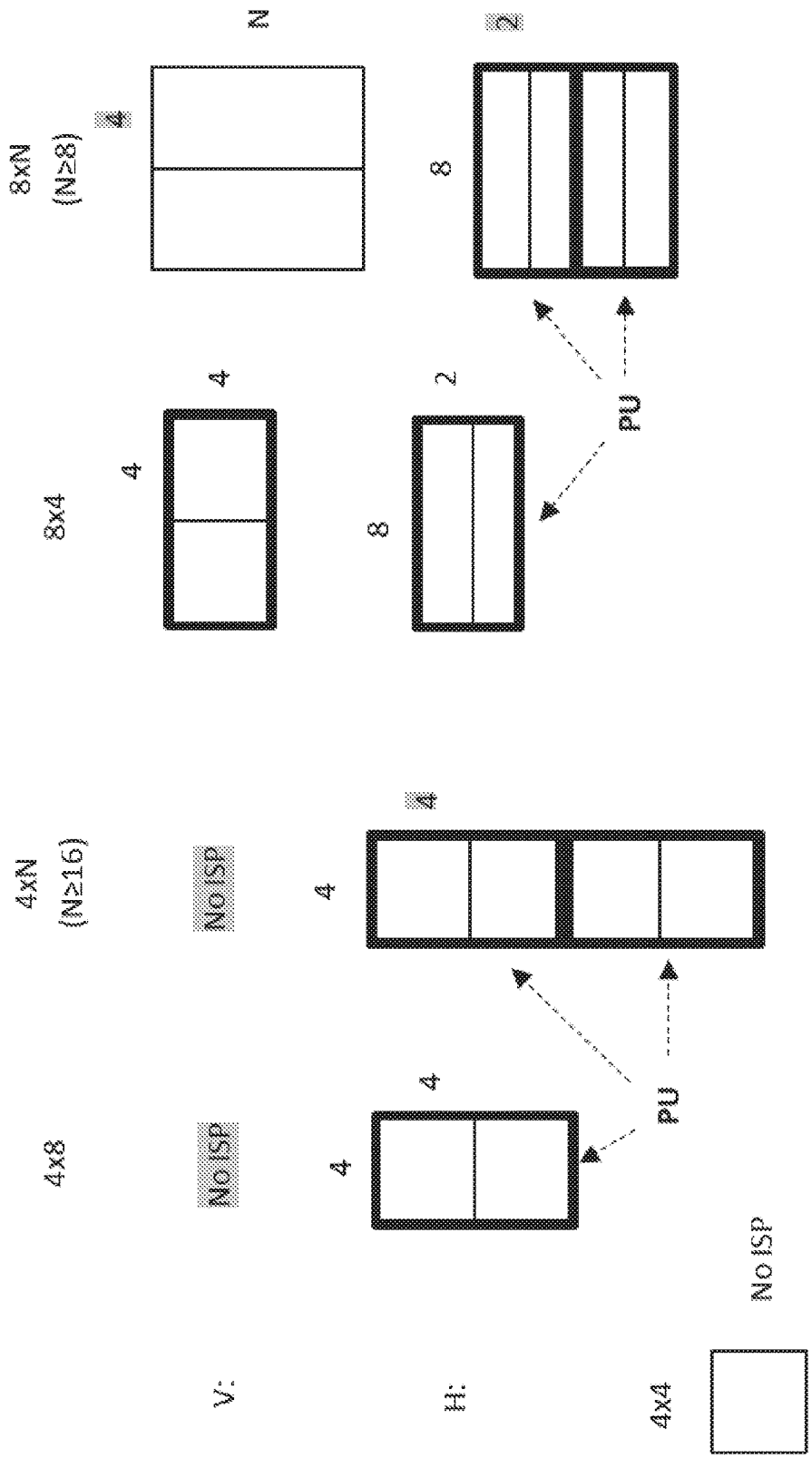
FIG. 19C illustrates an example where PU may include 32 samples.
Figure 19D:
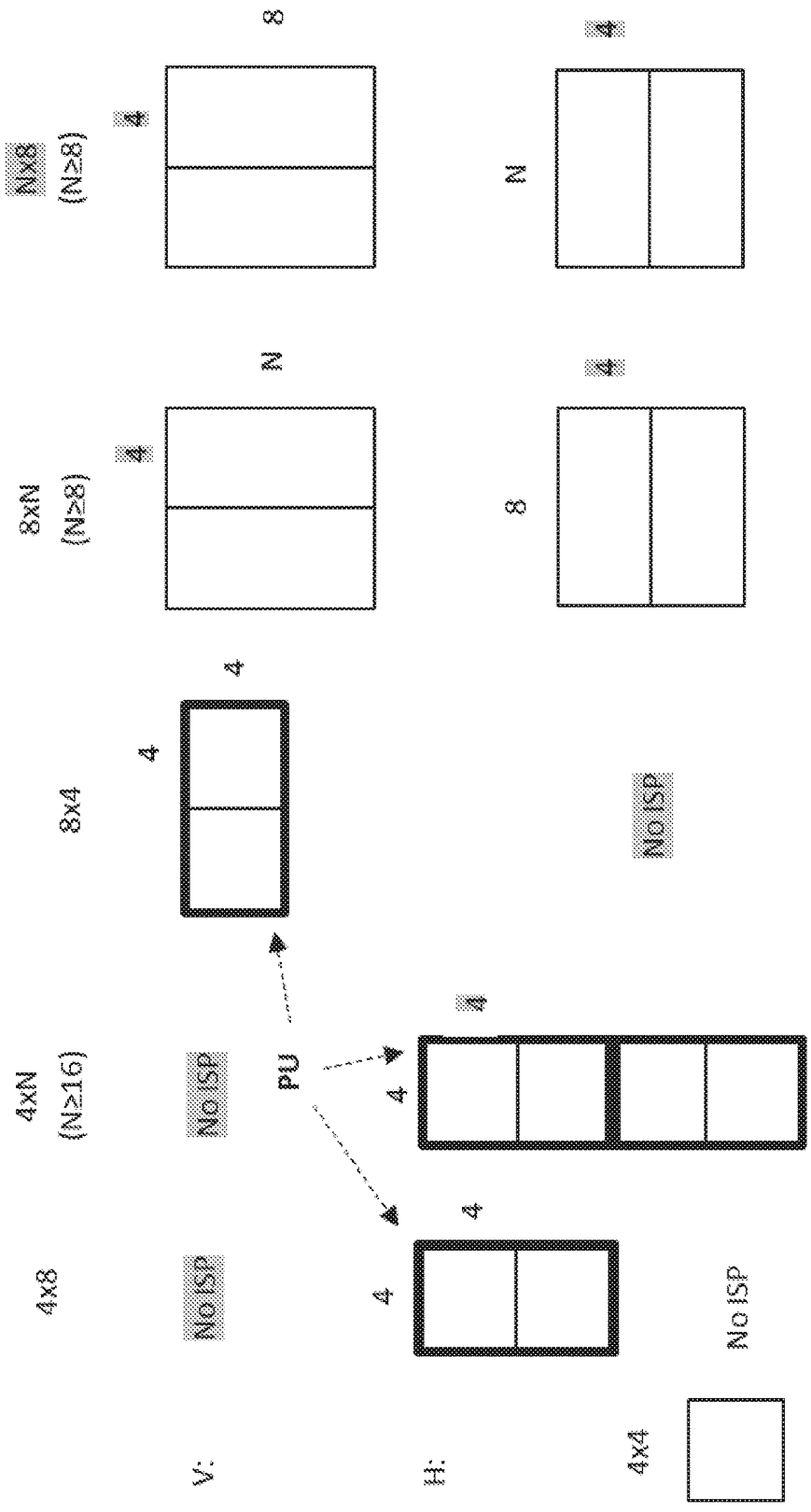
FIG. 19D illustrates an example where the examples illustrated in FIGS. 19A, 19B, and 19C may be applied simultaneously.

N×2 (N≥8) sub-partitions may be removed and replaced with N×4 sub-partitions. FIG. 19B illustrates an example where N×2 (N≥8) sub-partitions as illustrated in FIG. 18 may be removed and replaced with N×4 sub-partitions, for example, in addition to replacing 1×N (N≥16) and 2×N (N≥8) sub-partitions with 4×N sub-partitions as illustrated in FIG. 19A. As illustrated in FIG. 19B, no horizontal split ISP may be applied to 8×4 CUs, for example, in addition to no vertical split ISP for 4×8, 4×N (N≥16) CUs. Two N×4 horizontal split sub-partitions may be applied for N×8 (N8) CUs, as highlighted by boldfaced and underlined font. An ISP using multiple sub-partitions based intra-prediction may be performed in connection with the example shown in FIG. 19B.

A PU may include 32 or more samples. FIG. 19C illustrates an example where PU may include 32 samples, for example, in addition to replacing 1×N (N≥16) and 2×N (N≥8) sub-partitions with 4×N sub-partitions as illustrated in FIG. 19A. This change from 16 samples per PU to 32 samples per PU may be achieved, for example, by enforcing minimum PU sizes of intra-prediction. In examples, the minimum PU sizes may include 4×8 or 8×4 PU sizes, as highlighted by boldfaced and underlined font in FIG. 19C. As shown in FIG. 19C, a minimum size PU (e.g., 4×8 PU or 8×4 PU) may involve one same-PU-sized TU sub-partition, or two half-PU-sized (e.g., 4×4) TU sub-partitions. An ISP using multiple sub-partitions based intra-prediction may be performed in connection with the example shown in FIG. 19C. Multi-sub-partition prediction as described herein may be performed, for example, when a PU may include 32 or more samples.

FIG. 19D illustrates an example where the examples illustrated in FIGS. 19A, 19B, and 19C may be applied simultaneously. In an example, 1×N, 2×N, N×2 sub-partition removal may be applied simultaneously with the 4×8 or 8×4 minimum PU size enforcement, for example, together with ISP worst case throughput of 32 samples per PU cycle. An ISP using multiple sub-partitions based intra-prediction may be performed in connection with the example shown in FIG. 19D.

Figure 20:
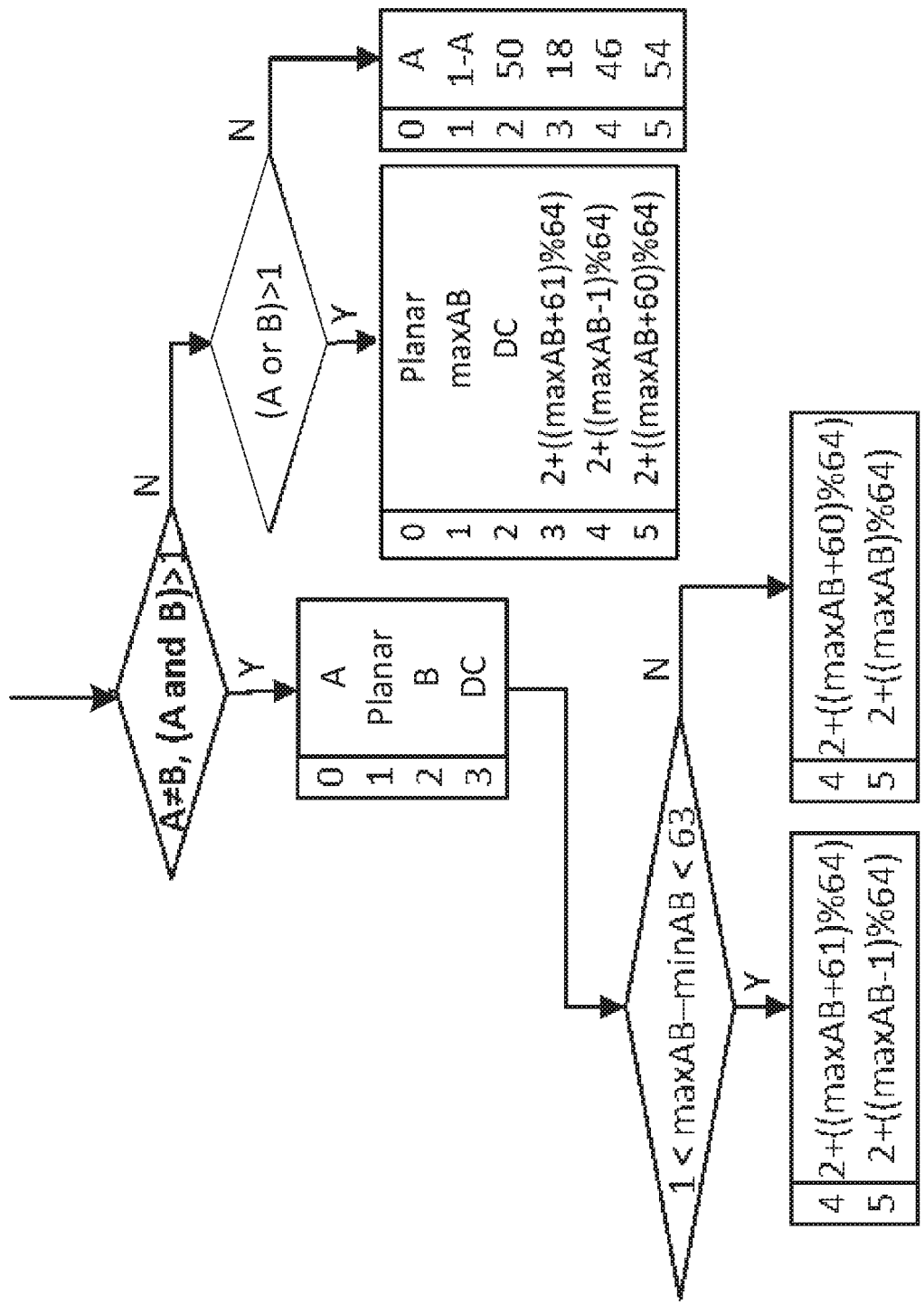
FIG. 20 illustrates an example of a unified MPM list generation/construction

Systems, methods, and instrumentalities may be provided for the MPM list construction. FIG. 20 illustrates an example of a unified MPM list generation/construction. In the unified MPM list construction example, a plurality of conditions (e.g., four conditions listed in Table 1) may be examined to determine a combined MPM list. For example, conditions 1 and 3 as listed in Table 1 may be combined as a single condition. Table 3 illustrates an example of conditions for unified MPM list construction. As illustrated in Table 3, a single condition, for example, condition (b) may be utilized to check whether intra mode A or intra mode B is an angular mode.

TABLE 3

Example conditions for unified MPM list construction

| # | Condition | Equivalent logical condition | Equivalent condition number in Table 1 |
|---|---|---|---|
| (a) | A and B are sufficiently distinct angular modes | (A ≠ B) && (A and B) > 1 | 2 |
| (b) | Either A or B is an angular mode | (A or B) > 1 | N/A |
| (c) | Default (none of the above conditions are satisfied) | — | 4 |

In an example, the MPM list generated upon meeting a condition as listed in Table 3 (e.g., condition (b)) may be the same as the MPM list generated upon meeting a condition as listed in Table 1 (e.g., Condition 3), as illustrated in FIG. 11. An example unified MPM list construction is illustrated in FIG. 20.

What is claimed:

1. An apparatus for video decoding, comprising:
 a processor configured to:
  determine that intra sub-partitions (ISP) is enabled for a current block;
  determine a sub-partition width for a sub-partition obtained via ISP;
  determine a prediction block width based on the sub-partition width and a minimum prediction block width, wherein, on a condition that the sub-partition width is less than the minimum prediction block width, the prediction block width is equal to the minimum prediction block width, and on a condition that the sub-partition width is greater than or equal to the minimum prediction block width, the prediction block width is equal to the sub-partition width;
  predict the sub-partition based on the prediction block width; and
  decode the current block based on the predicted sub-partition.

2. The apparatus of claim 1, wherein the minimum prediction block width is 4 samples.

3. The apparatus of claim 1, wherein a prediction block for the sub-partition comprises a plurality of transform block sub-partitions when a current block width is 4 samples and a current block height is 8 samples or greater.

4. The apparatus of claim 1, wherein a prediction block for the sub-partition comprises a plurality of transform block sub-partitions when a current block width is 8 samples and a current block height is 8 samples or greater.

5. The apparatus of claim 1, wherein the sub-partition is predicted using neighboring samples of the current block when the current block is vertically split, a current block width is 4 samples, and a current block height is 8 samples or greater.

6. The apparatus of claim 1, wherein the sub-partition is predicted using a neighboring sample of the current block and a sample from a reconstructed sub-partition in the current block.

7. The apparatus of claim 1, wherein the sub-partition is predicted using a neighboring sample of the current block and a sample from a reconstructed sub-partition in the current block when a current block width is 8 samples and a current block height is 8 samples or greater.

8. The apparatus of claim 1, wherein the processor is further configured to:
 determine a plurality of reference samples of a prediction block that has the prediction block width, wherein the plurality of reference samples of the prediction block comprises a neighboring sample of the prediction block, and wherein the sub-partition is predicted using the plurality of reference samples of the prediction block.

9. The apparatus of claim 1, wherein the apparatus further comprises a memory.

10. A method for video decoding comprising:
 determining that intra sub-partitions (ISP) is enabled for a current block;
 determining a sub-partition width for a sub-partition obtained via ISP;
 determining a prediction block width based on the sub-partition width and a minimum prediction block width, wherein, on a condition that the sub-partition width is less than the minimum prediction block width, the prediction block width is equal to the minimum prediction block width, and on a condition that the sub-partition width is greater than or equal to the minimum prediction block width, the prediction block width is equal to the sub-partition width;
predicting the sub-partition based on the prediction block width; and
decoding the current block based on the predicted sub-partition.

11. The method of claim 10, wherein the minimum prediction block width is 4 samples.

12. The method of claim 10, wherein a prediction block for the sub-partition comprises a plurality of transform block sub-partitions when a current block width is 4 samples and a current block height is 8 samples or greater.

13. The method of claim 10, wherein a prediction block for the sub-partition is predicted using a neighboring sample of the current block when the current block is vertically split, a current block width is 4 samples, and a current block height is 8 samples or greater.

14. An apparatus for video encoding, comprising:
a processor configured to:
  determine that intra sub-partitions (ISP) is enabled for a current block;
  determine a sub-partition width for a sub-partition obtained via ISP;
  determine a prediction block width based on the sub-partition width and a minimum prediction block width, wherein, on a condition that the sub-partition width is less than the minimum prediction block width, the prediction block width is equal to the minimum prediction block width, and on a condition that the sub-partition width is greater than or equal to the minimum prediction block width, the prediction block width is equal to the sub-partition width;
  predict the sub-partition based on the prediction block width; and
  encode the current block based on the predicted sub-partition.

15. The apparatus of claim 14, wherein the minimum prediction block width is 4 samples.

16. The apparatus of claim 14, wherein a prediction block for the sub-partition comprises a plurality of transform block sub-partitions when a current block width is 4 samples and a current block height is 8 samples or greater, or when the current block width is 8 samples and the current block height is 8 samples or greater.

17. A method for video encoding, comprising:
determining that intra sub-partitions (ISP) is enabled for a current block;
determining a sub-partition width for a sub-partition obtained via ISP;
determining a prediction block width based on the sub-partition width and a minimum prediction block width, wherein, on a condition that the sub-partition width is less than the minimum prediction block width, the prediction block width is equal to the minimum prediction block width, and on a condition that the sub-partition width is greater than or equal to the minimum prediction block width, the prediction block width is equal to the sub-partition width;
predicting the sub-partition based on the prediction block width; and
encoding the current block based on the predicted sub-partition.

18. The method of claim 17, wherein the sub-partition is predicted using neighboring samples of the current block when the current block is vertically split, a current block width is 4 samples, and a current block height is 8 samples or greater.

19. The method of claim 17, wherein the sub-partition width is a width of a transport block.

* * * * *